(12) United States Patent
Lee et al.

(10) Patent No.: US 12,041,531 B2
(45) Date of Patent: Jul. 16, 2024

(54) METHOD AND DEVICE FOR PROVIDING AUDIO SERVICE USING BLUETOOTH TECHNOLOGY

(71) Applicant: LG ELECTRONICS INC., Seoul (KR)

(72) Inventors: Hyeonjae Lee, Seoul (KR); Minsoo Lee, Seoul (KR); Jinkwon Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 388 days.

(21) Appl. No.: 17/423,770

(22) PCT Filed: Jan. 17, 2020

(86) PCT No.: PCT/KR2020/000889
§ 371 (c)(1),
(2) Date: Jul. 19, 2021

(87) PCT Pub. No.: WO2020/149708
PCT Pub. Date: Jul. 23, 2020

(65) Prior Publication Data
US 2022/0030505 A1    Jan. 27, 2022

(30) Foreign Application Priority Data
Jan. 17, 2019  (KR) .................. 10-2019-0006397

(51) Int. Cl.
*H04W 48/10* (2009.01)
*H04R 5/02* (2006.01)
(Continued)

(52) U.S. Cl.
CPC ............. *H04W 48/10* (2013.01); *H04R 5/02* (2013.01); *H04W 4/80* (2018.02); *H04W 48/16* (2013.01);
(Continued)

(58) Field of Classification Search
CPC ....... H04W 48/10; H04W 4/80; H04W 48/16; H04W 12/0431; H04W 12/50; H04R 5/02; H04S 5/02
(Continued)

(56) References Cited

U.S. PATENT DOCUMENTS

2013/0232282 A1* 9/2013 Kim .................. H04M 1/72415
710/21
2017/0006415 A1* 1/2017 Song ....................... H04W 4/80
(Continued)

FOREIGN PATENT DOCUMENTS

KR    1020170016883    2/2017
KR    1020170038825    4/2017
(Continued)

*Primary Examiner* — Obaidul Huq
(74) *Attorney, Agent, or Firm* — BRYAN CAVE LEIGHTON PAISNER LLP

(57) ABSTRACT

The present disclosure relates to a method and device for a control device to set an audio channel in a wireless communication system by using Bluetooth Low Energy technology. According to the present disclosure, an advertising packet is received from each of a plurality of devices, wherein the advertising packet includes at least one among location information, codec information, and/or role information for the respective device. The control device transmits a plurality of pieces of setting information, for providing an audio service, to the plurality of devices on the basis of the advertising packet, wherein each piece of setting information includes delay information about the respective device, and the control device transmits channel setting information for an isochronous channel, for providing the audio service, to the plurality of devices.

14 Claims, 29 Drawing Sheets

(51) Int. Cl.
*H04W 4/80* (2018.01)
*H04W 48/16* (2009.01)
*H04S 5/02* (2006.01)
*H04W 12/0431* (2021.01)
*H04W 12/50* (2021.01)

(52) U.S. Cl.
CPC .......... *H04S 5/02* (2013.01); *H04W 12/0431* (2021.01); *H04W 12/50* (2021.01)

(58) Field of Classification Search
USPC ........................................ 370/310, 328, 329
See application file for complete search history.

(56) References Cited

U.S. PATENT DOCUMENTS

| | | | |
|---|---|---|---|
| 2017/0070765 A1* | 3/2017 | Chang | H04N 21/6131 |
| 2017/0193816 A1 | 7/2017 | Lee et al. | |
| 2019/0045304 A1* | 2/2019 | Bhalla | H04R 3/12 |

FOREIGN PATENT DOCUMENTS

| | | |
|---|---|---|
| KR | 1020180117618 | 10/2018 |
| WO | 2018048268 | 3/2018 |

\* cited by examiner

[FIG. 1]
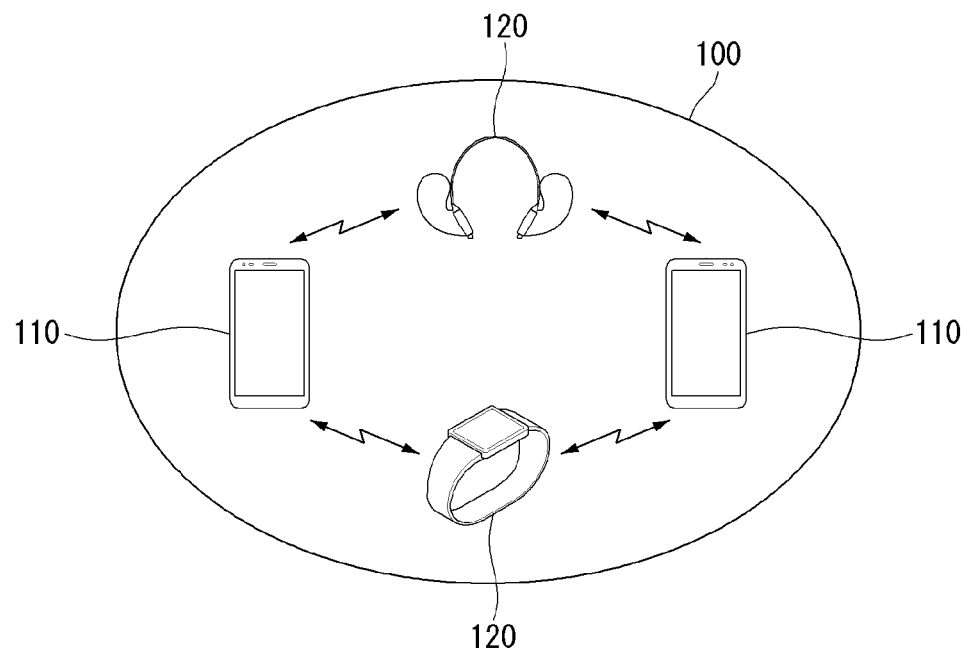

[FIG. 2]
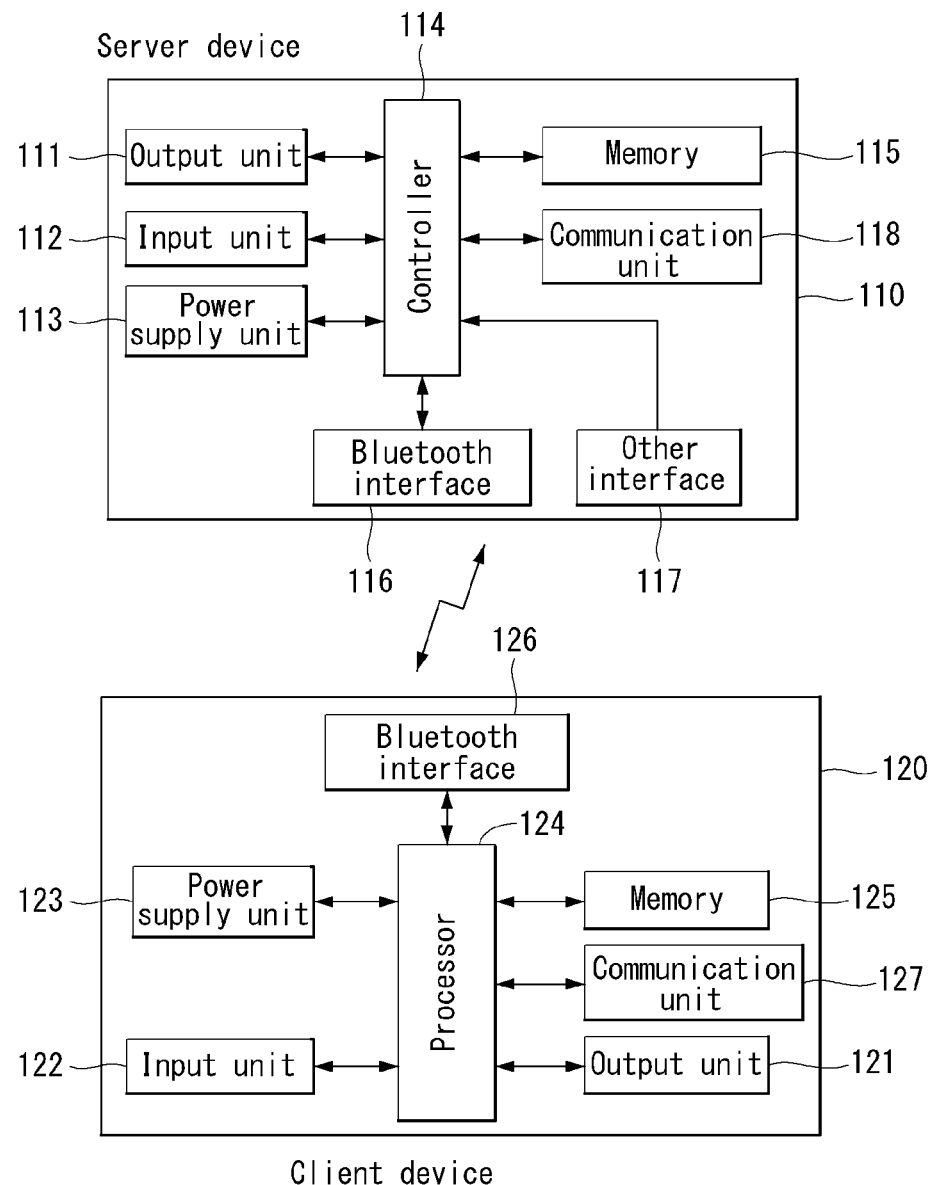

[FIG. 3]
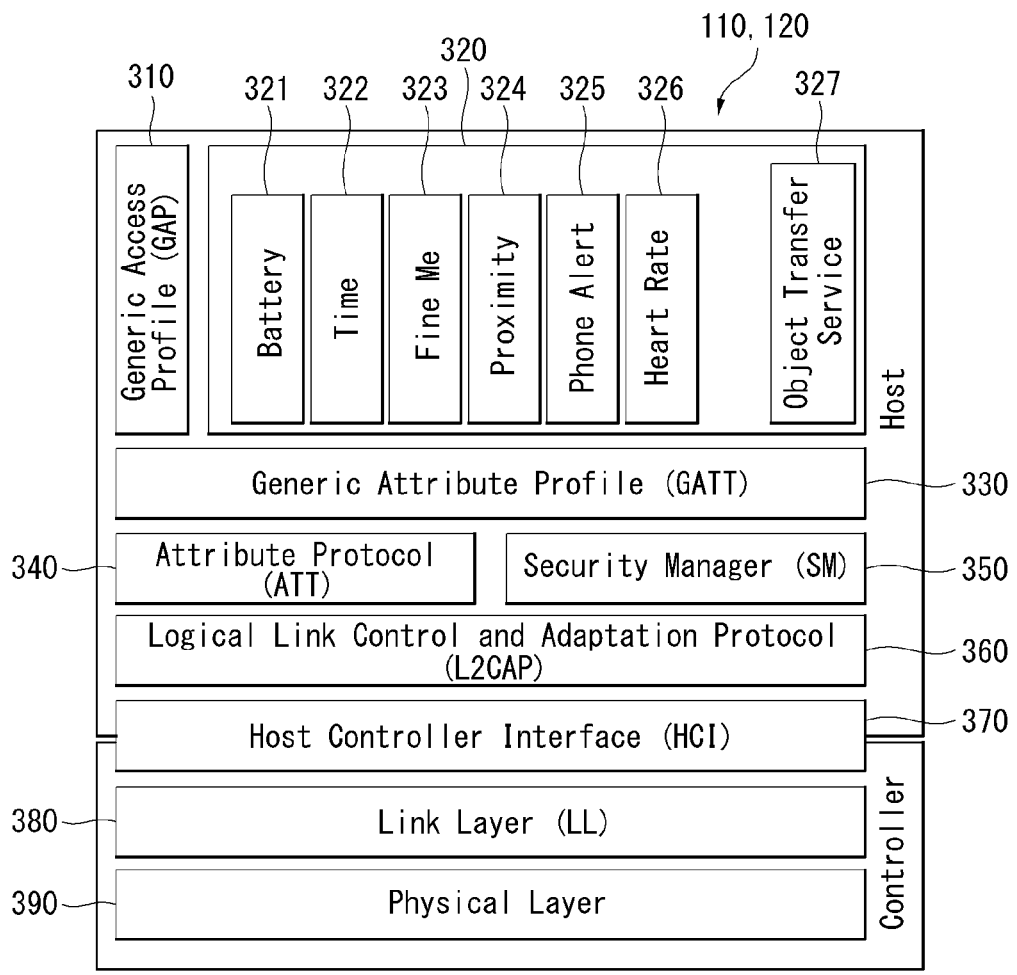

[FIG. 4]
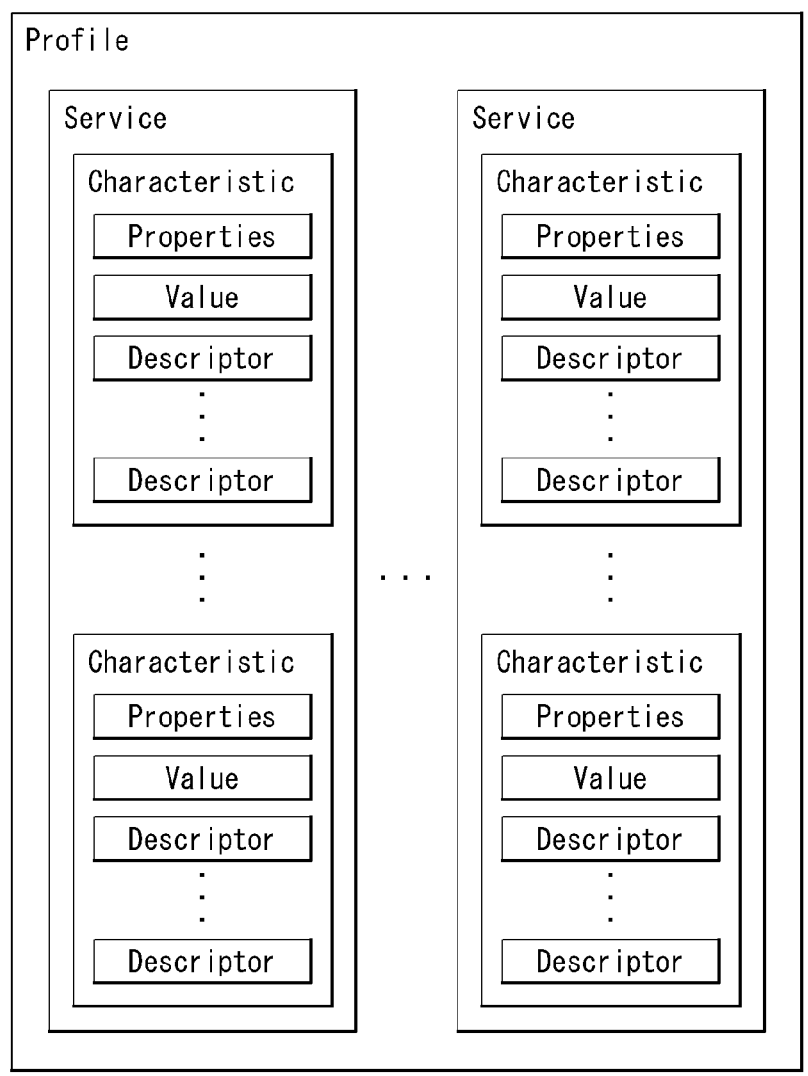

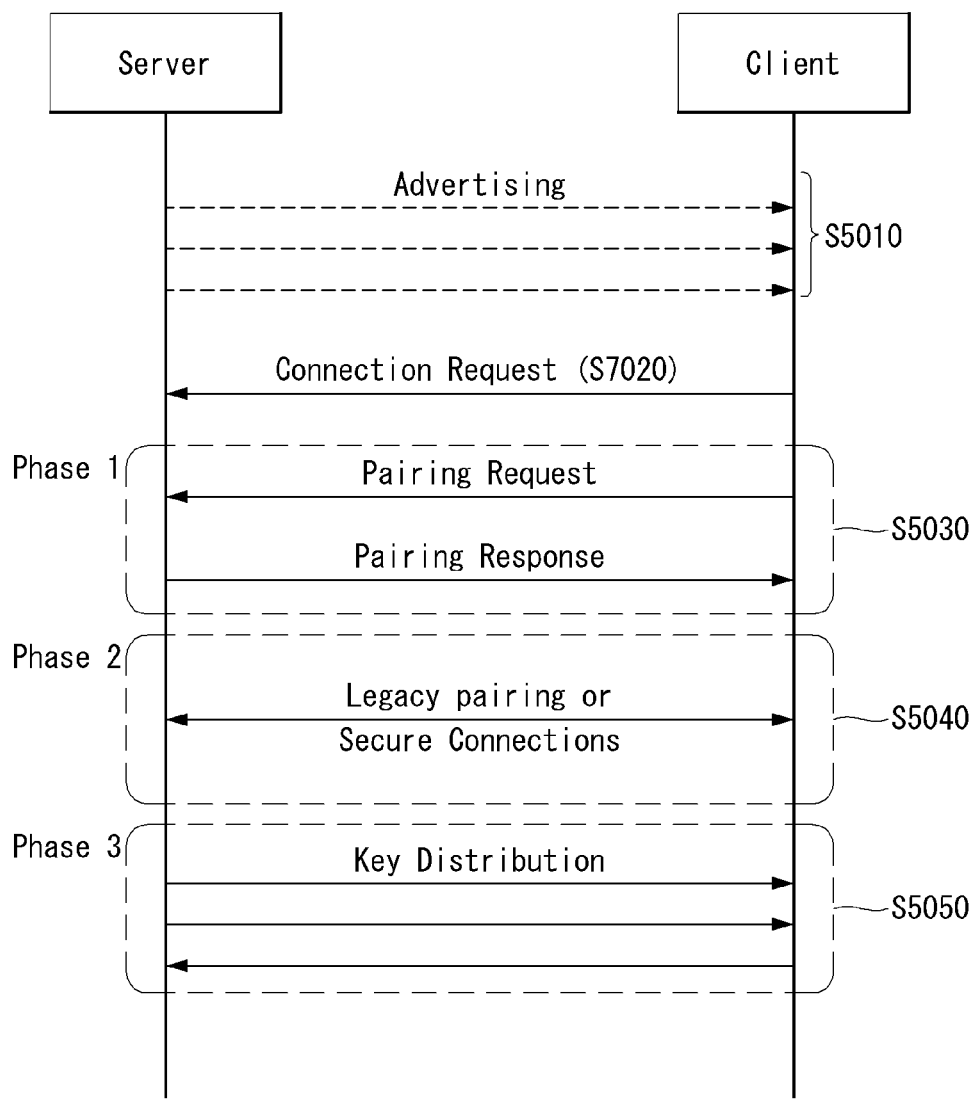

[FIG. 6]
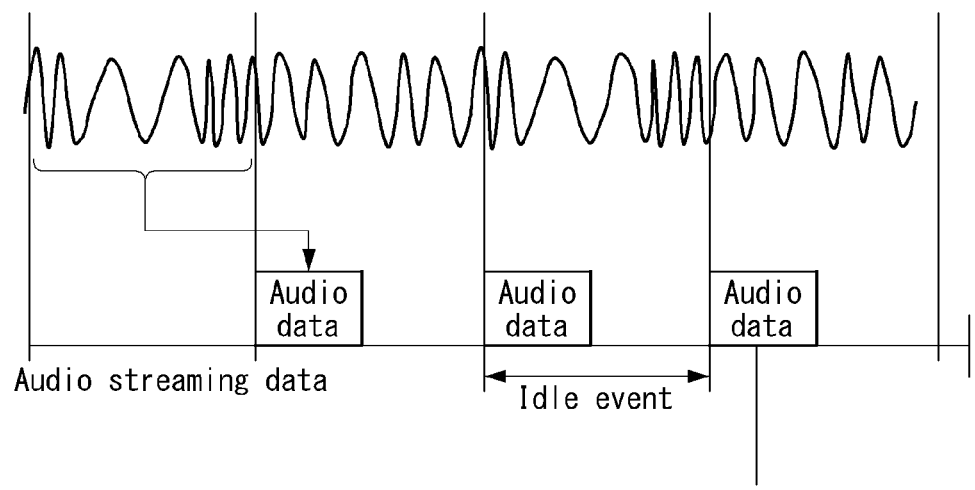
[FIG. 7]
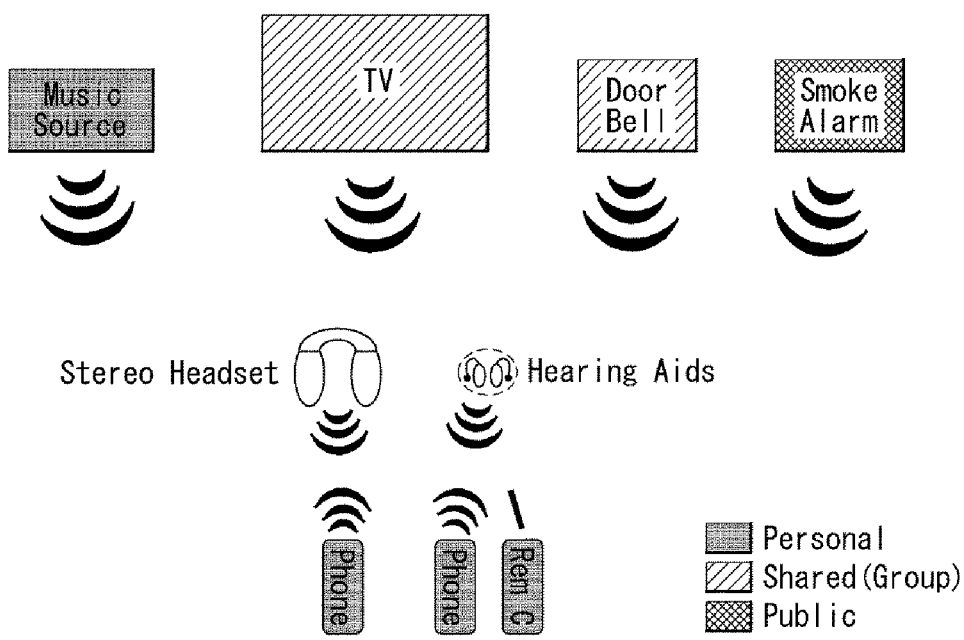

[FIG. 8]
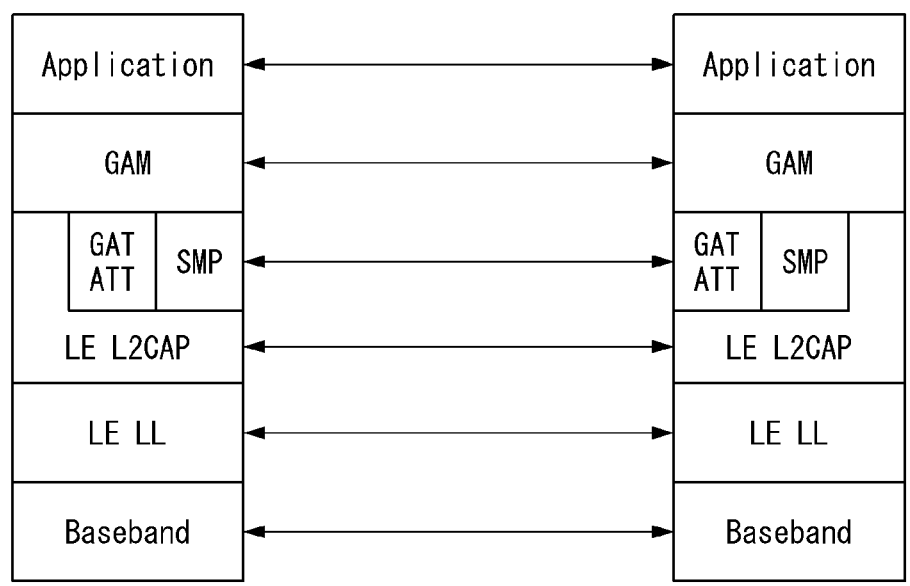

[FIG. 9]
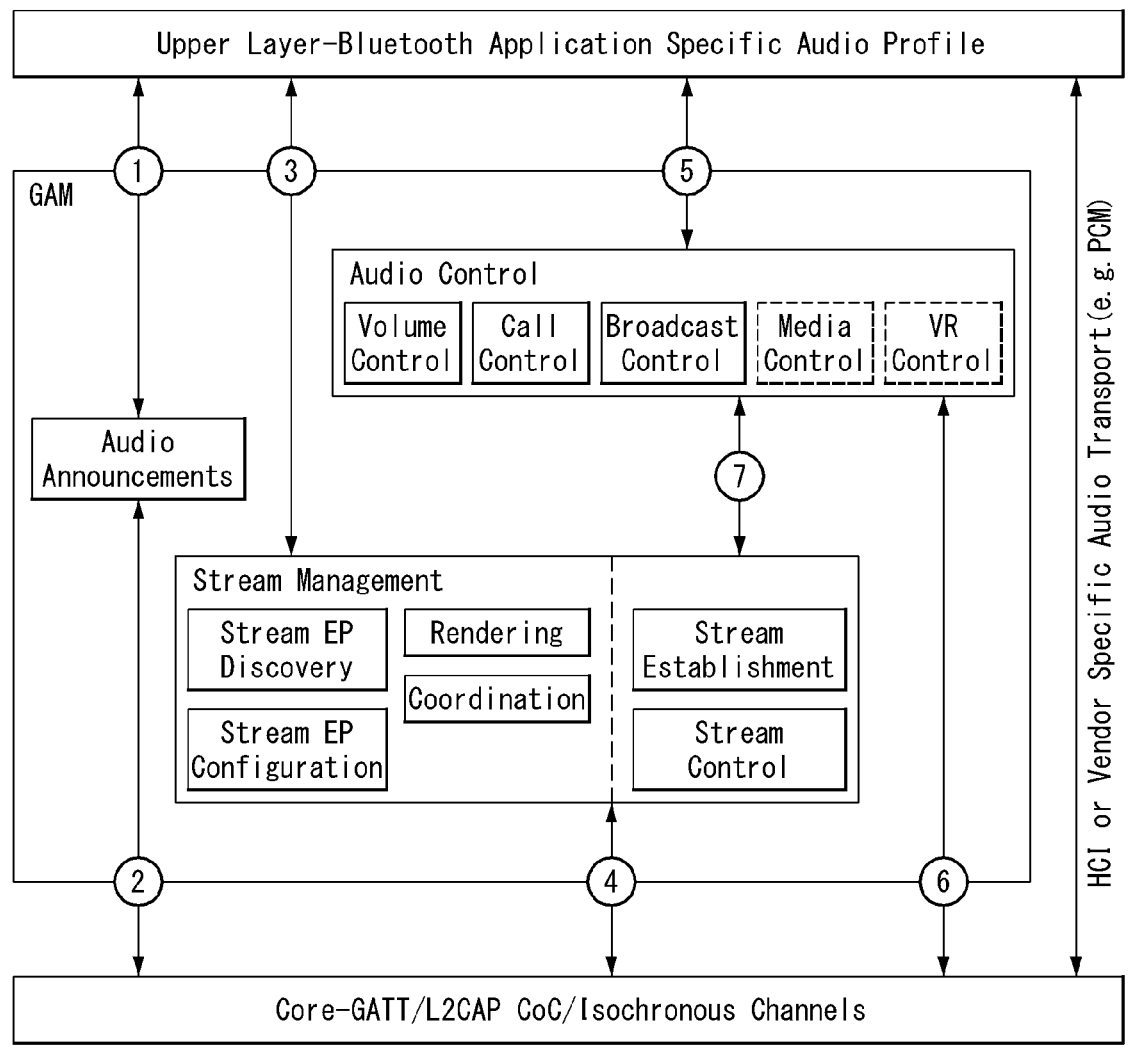

[FIG. 10]
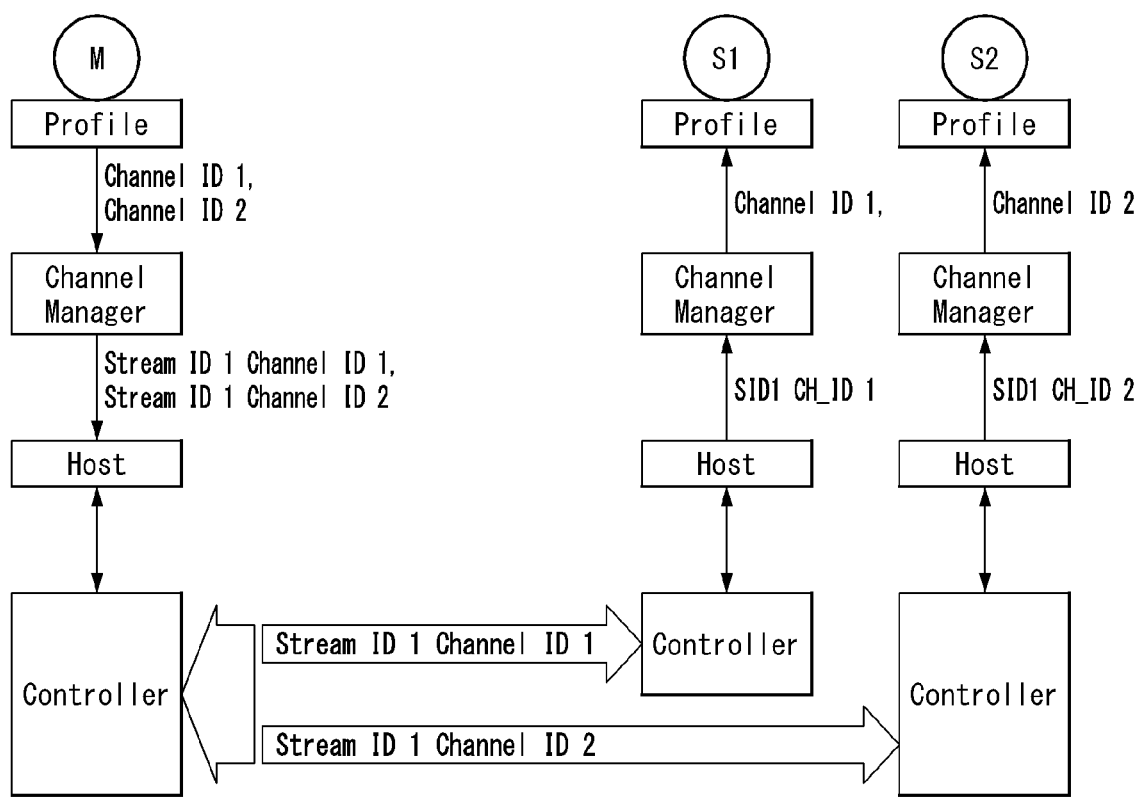

[FIG. 11]
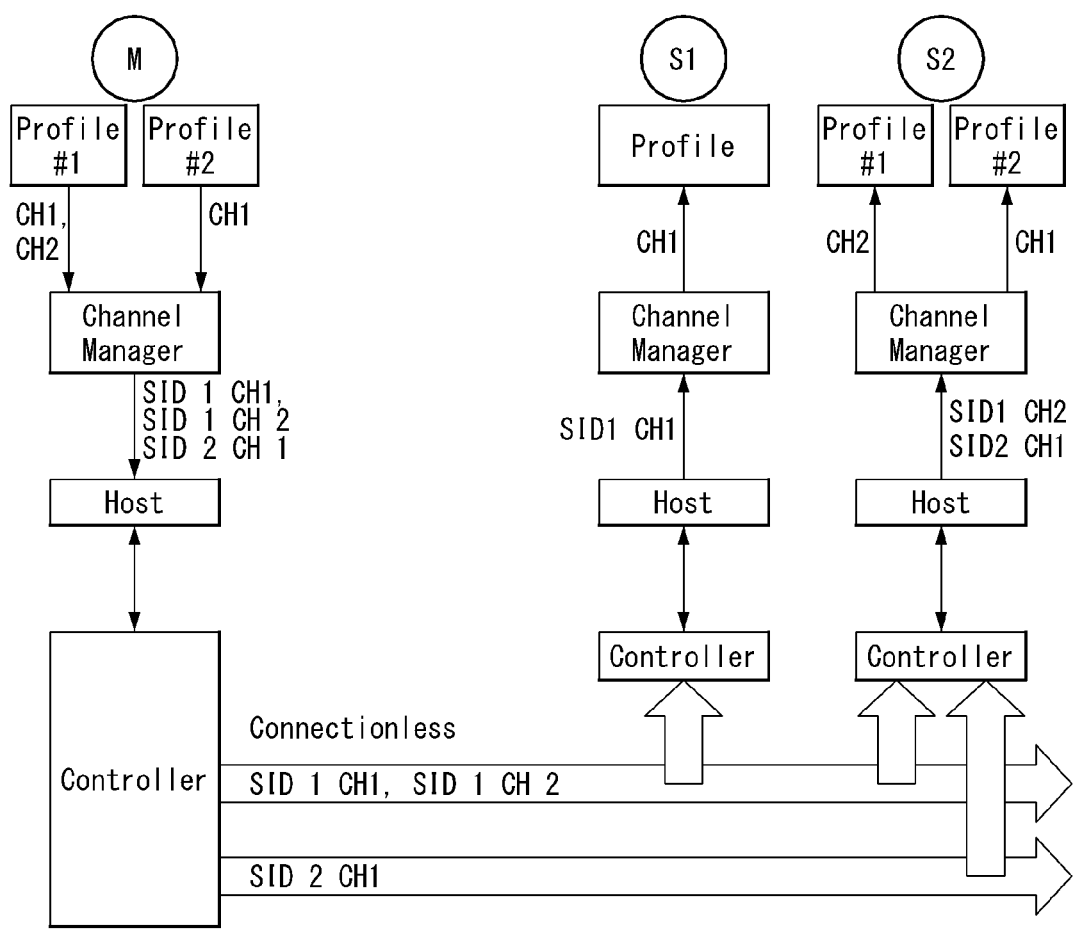

[FIG. 12]
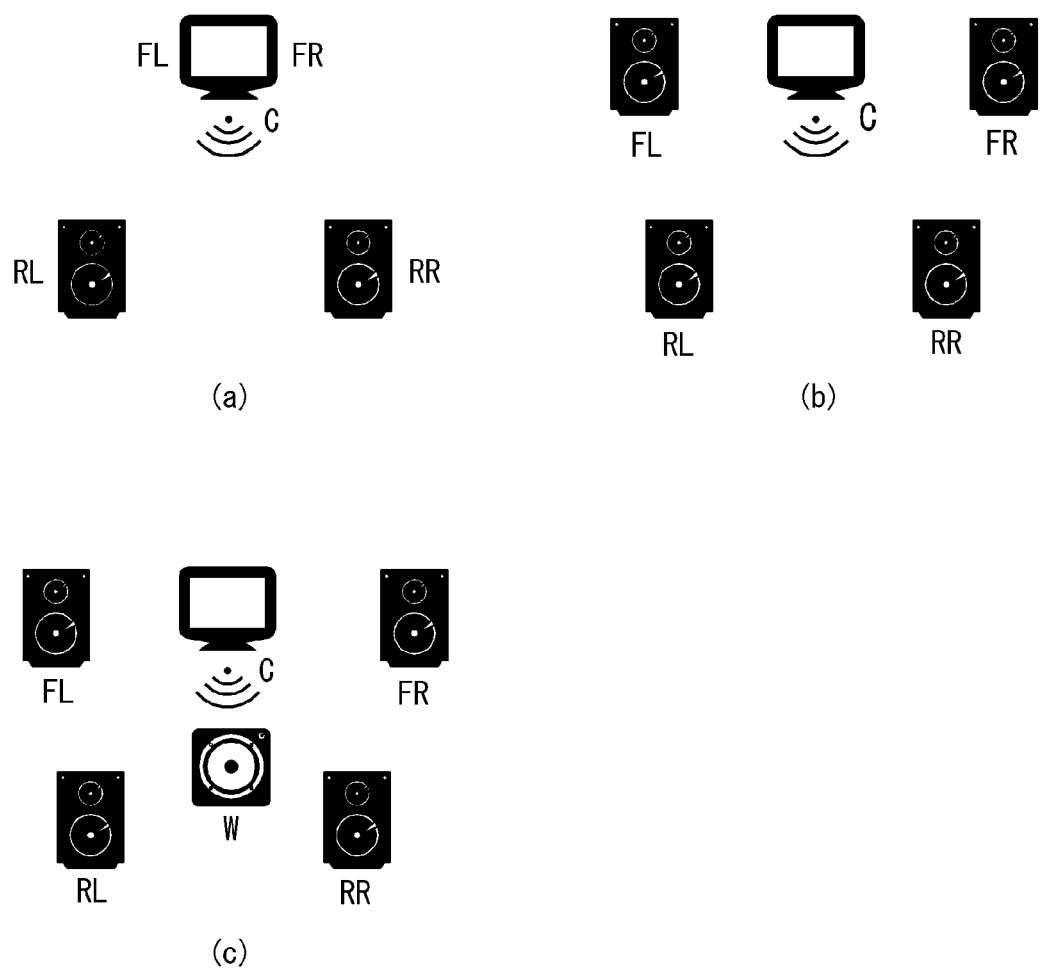

[FIG. 13]
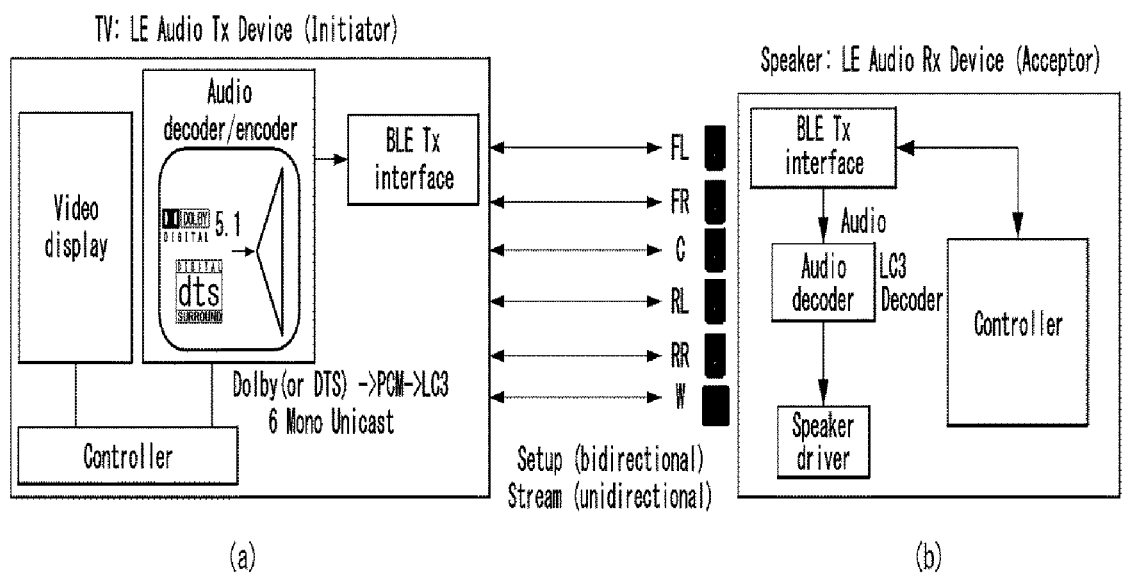

[FIG. 14]
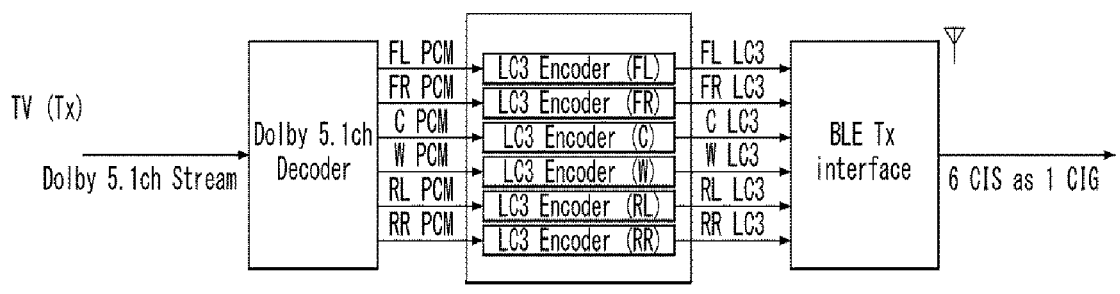
(a)
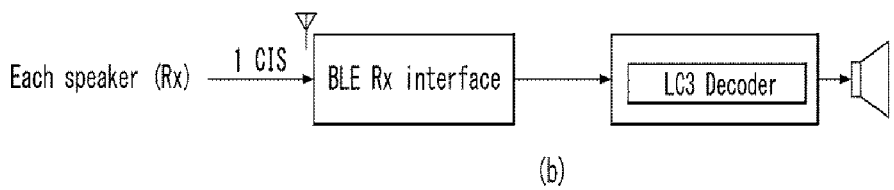
(b)

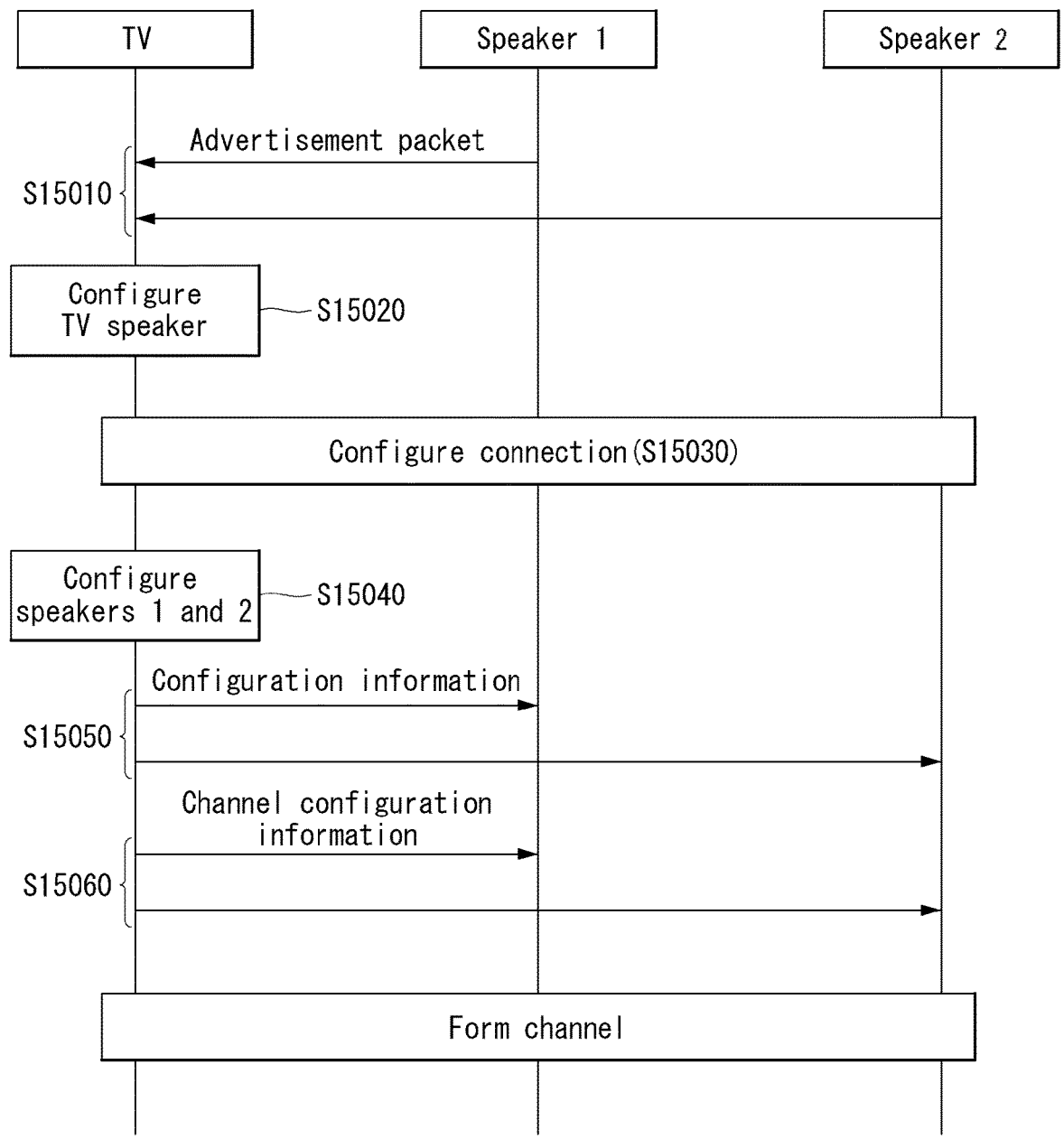
[FIG. 15]

[FIG. 16]
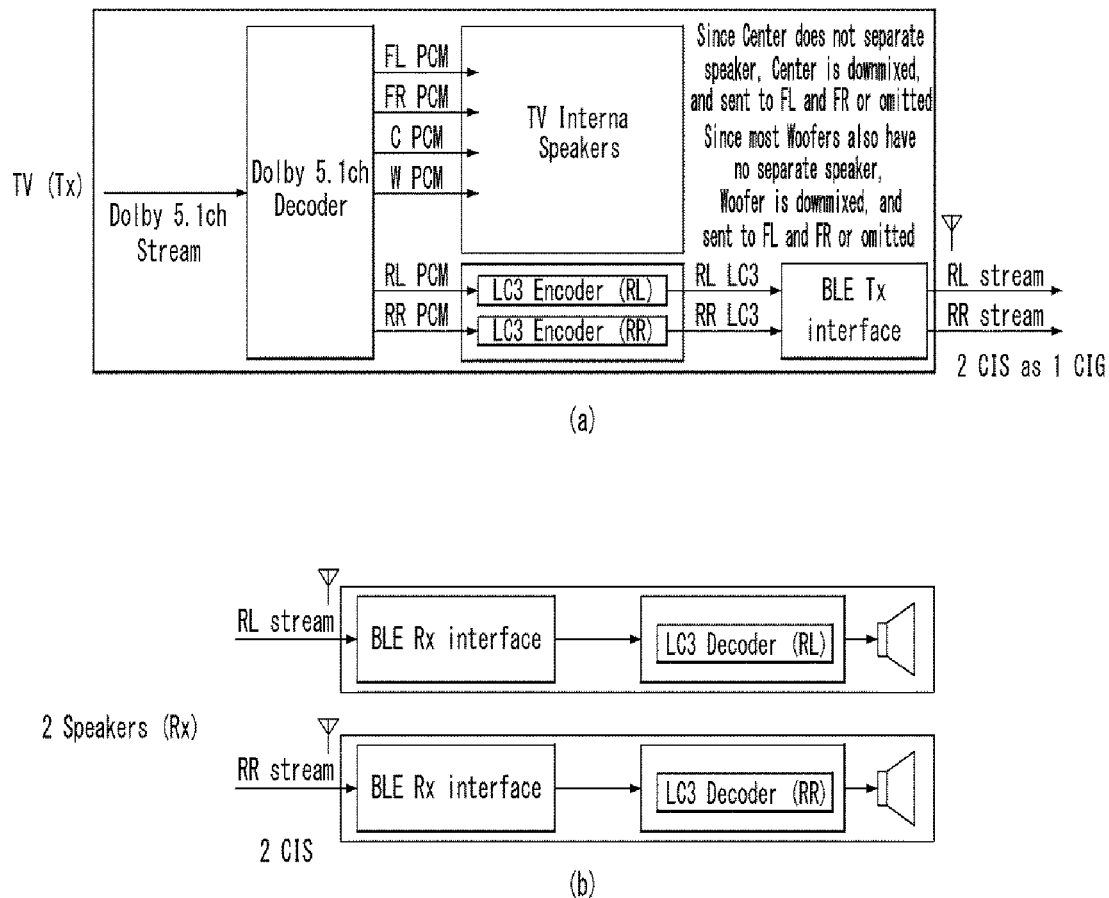
[FIG. 17]
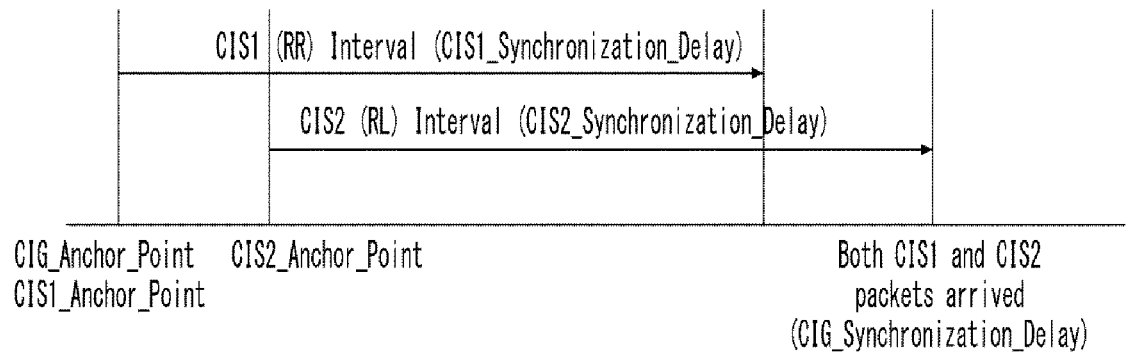

[FIG. 18]
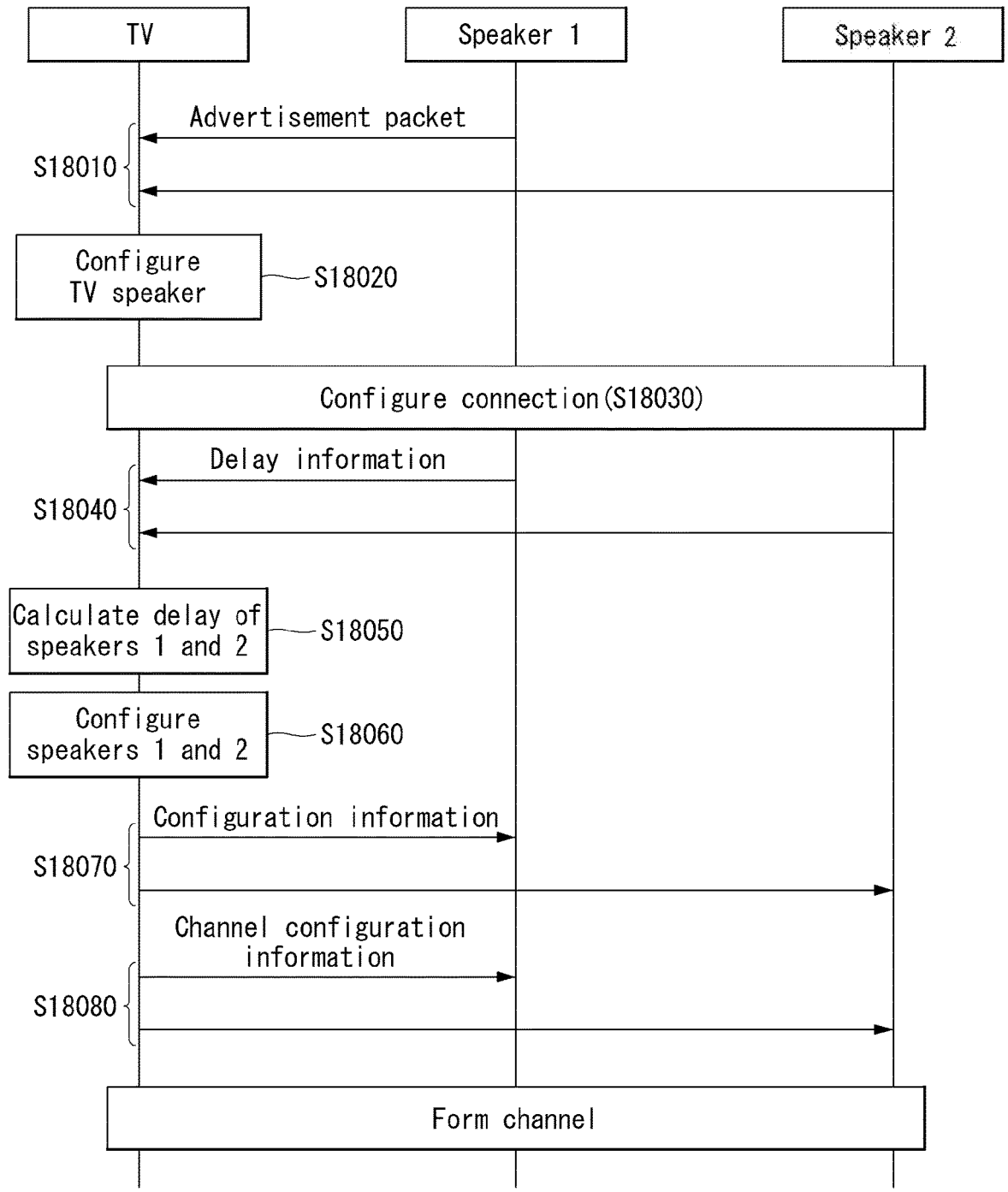

[FIG. 19]
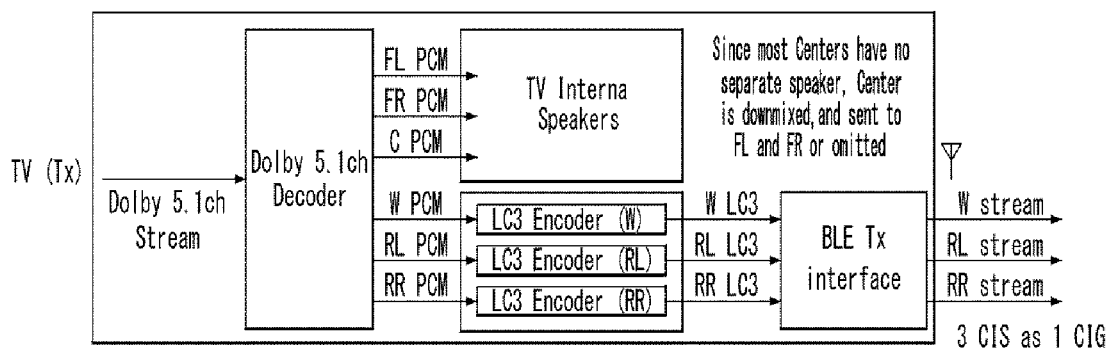
(a)
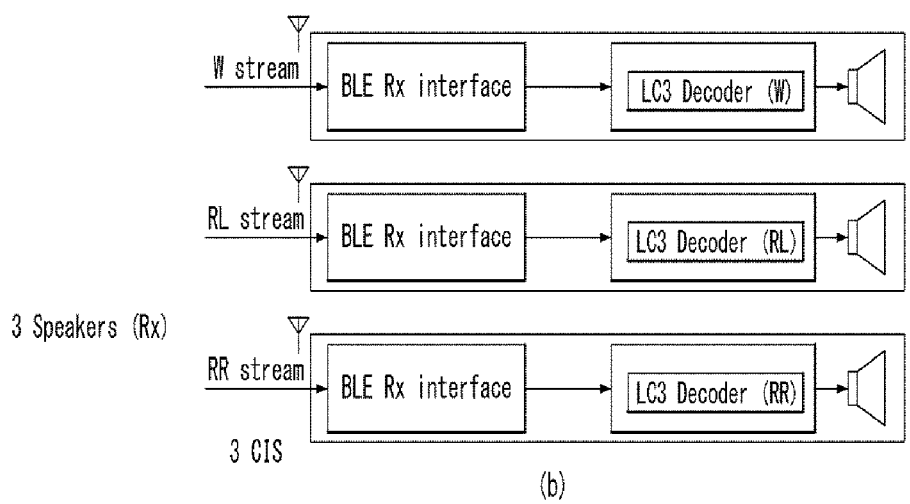
(b)

[FIG. 20]
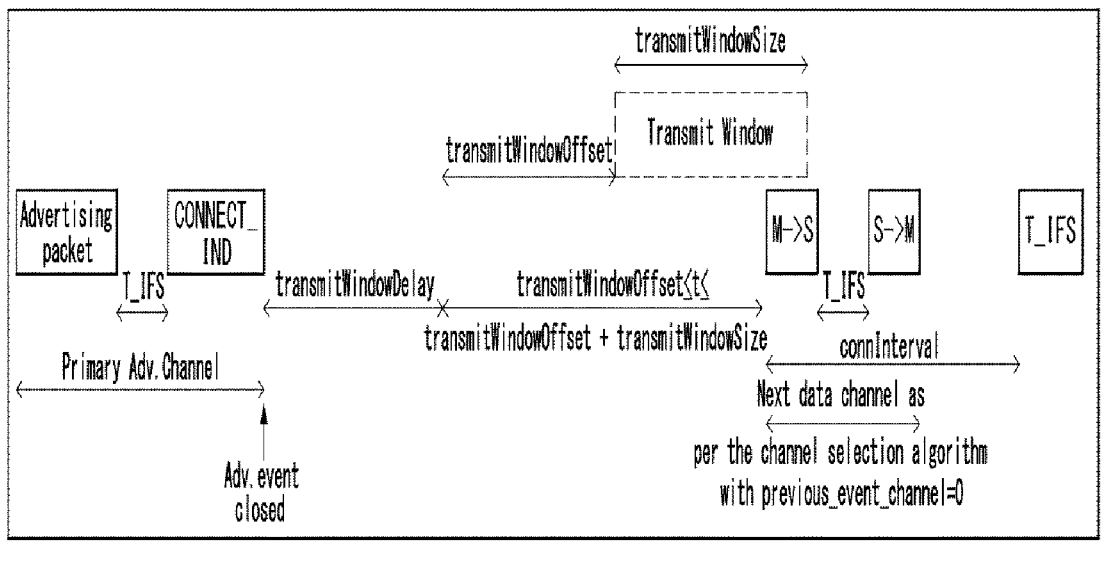
(a)
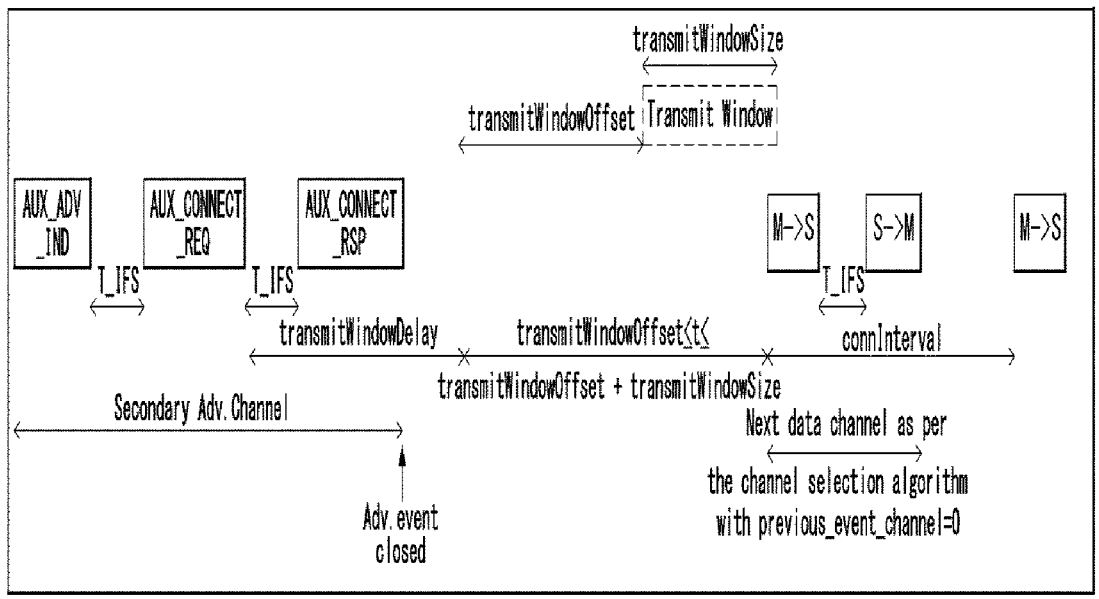
(b)

[FIG. 21]
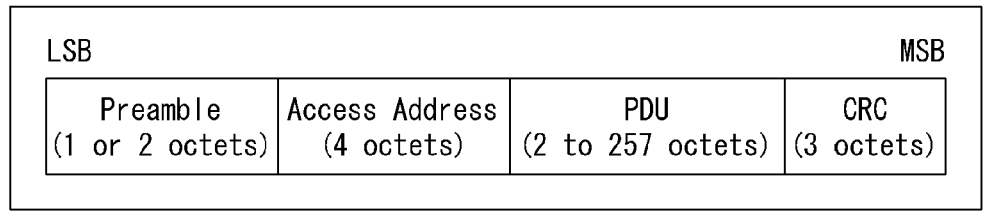
(a)
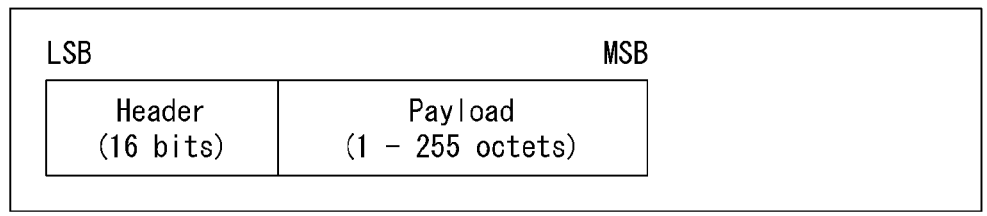
(b)
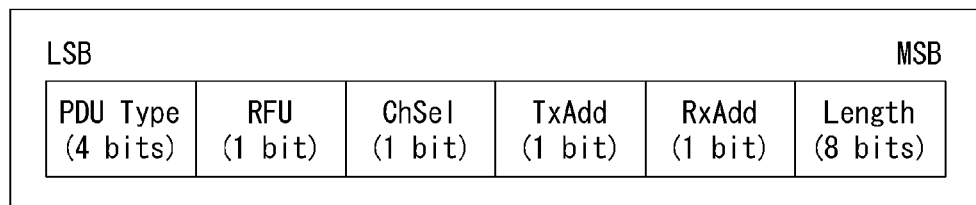
(c)
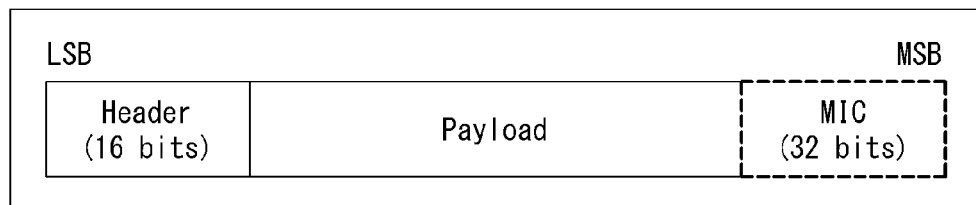
(d)

[FIG. 22]

| Header | | | | | |
|---|---|---|---|---|---|
| LLID (2 bits) | NESN (1 bit) | SN (1 bit) | MD (1 bit) | RFU (3 bits) | Length (8 bits) |

(a)

| Payload | | |
|---|---|---|
| InitA (6 octets) | AdvA (6 octets) | LLData (22 octets) |

(b)

| LLData | | | | | | | | | |
|---|---|---|---|---|---|---|---|---|---|
| AA (4 octets) | CRCInit (3 octets) | WinSize (1 octet) | Winoffset (2 octets) | Interval (2 octets) | Latency (2 octets) | Timeout (2 octets) | ChM (5 octets) | Hop (5 bits) | SCA (3 bits) |

| Connected isochronous PDU Header | | | | | | | |
|---|---|---|---|---|---|---|---|
| LLID (2 bits) | NESN (1 bit) | SN (1 bit) | CIE (1 bit) | RFU (1 bit) | NPI (1 bit) | RFU (1 bit) | Length (8 bits) |

(a)

| SDU_Parameters | | | | | | | | |
|---|---|---|---|---|---|---|---|---|
| CIG_ID (1 octet) | CIS_ID (1 octet) | PHY_info (2 octet) | SDU_Parameters (10 octets) | CIS_Parameters (11 octets) | CIS_Offset_Min (3 octets) | CIS_Offset_Max (3 octets) | connEventCount (2 octets) |

(b)

| CIS_Parameters | | | | | | | | |
|---|---|---|---|---|---|---|---|---|
| Payload_M_TO_S (1 octet) | Payload_S_TO_M (1 octet) | NSE (1 octet) | Sub_Interval (3 octets) | BN_M_TO_S (4 bits) | BN_S_TO_M (4 bits) | FT_M_TO_S (1 octet) | FT_S_TO_M (1 octet) | ISO_Interval (2 octets) |

(c)

[FIG. 24]
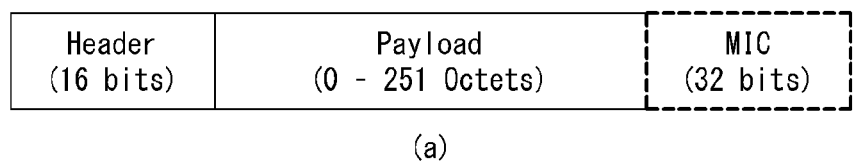
(a)
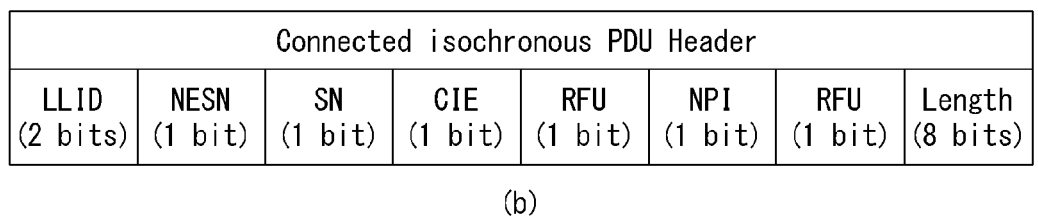
(b)
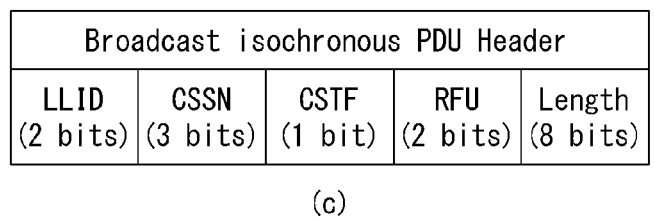
(c)

[FIG. 25]
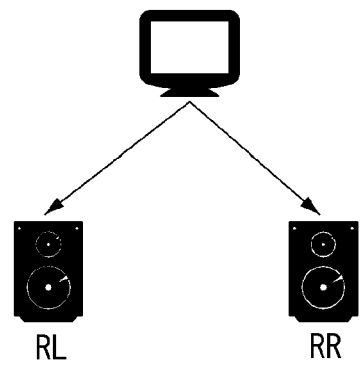
(a)
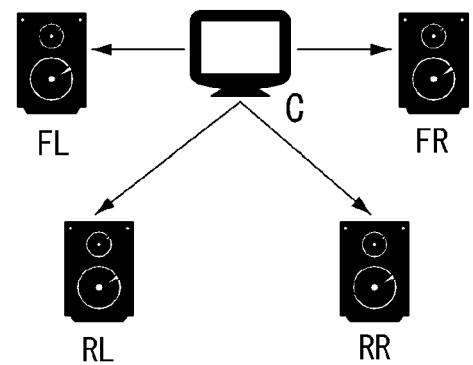
(b)
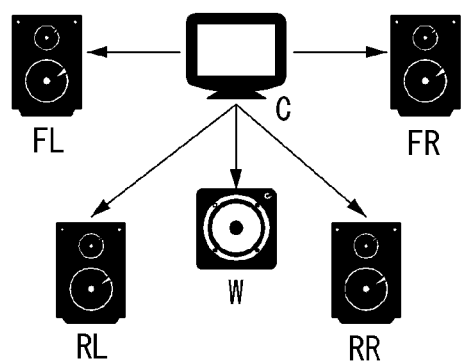
(c)

[FIG. 26]
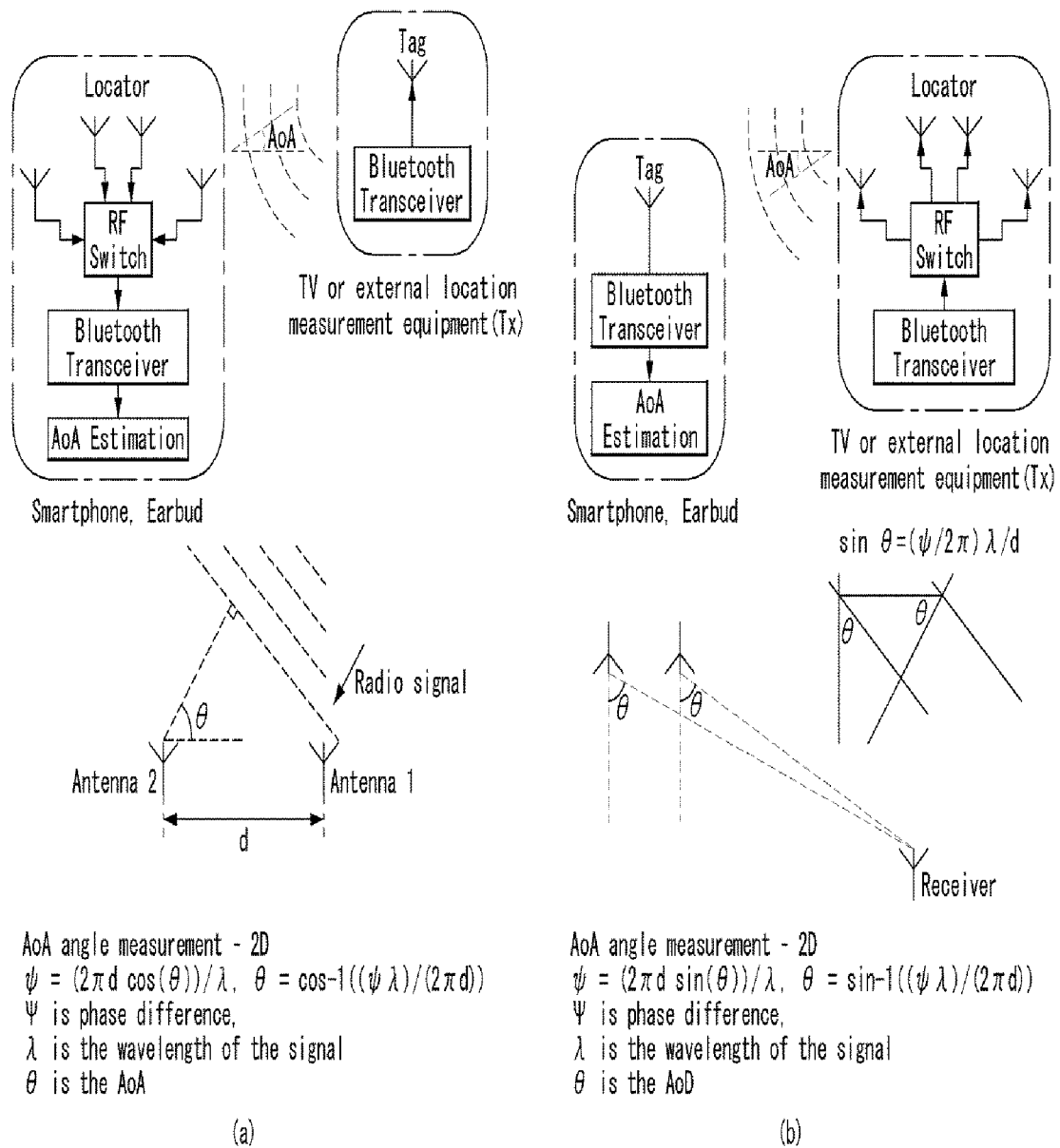

[FIG. 27]
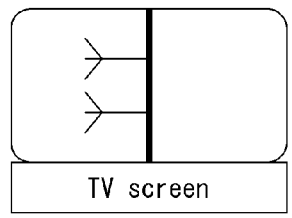
TV screen
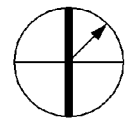
Angle between TV and speaker
(+45 degrees)
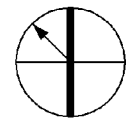
Angle between TV and speaker
(−45 degrees)
(a)
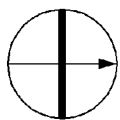
Angle between TV and speaker
(+90 degrees)
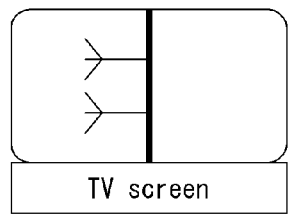
TV screen
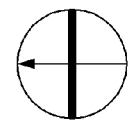
Angle between TV and speaker
(−90 degrees)
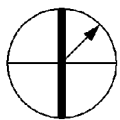
Angle between TV and speaker
(+45 degrees)
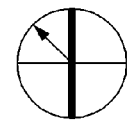
Angle between TV and speaker
(−45 degrees)
(b)

[FIG. 28]
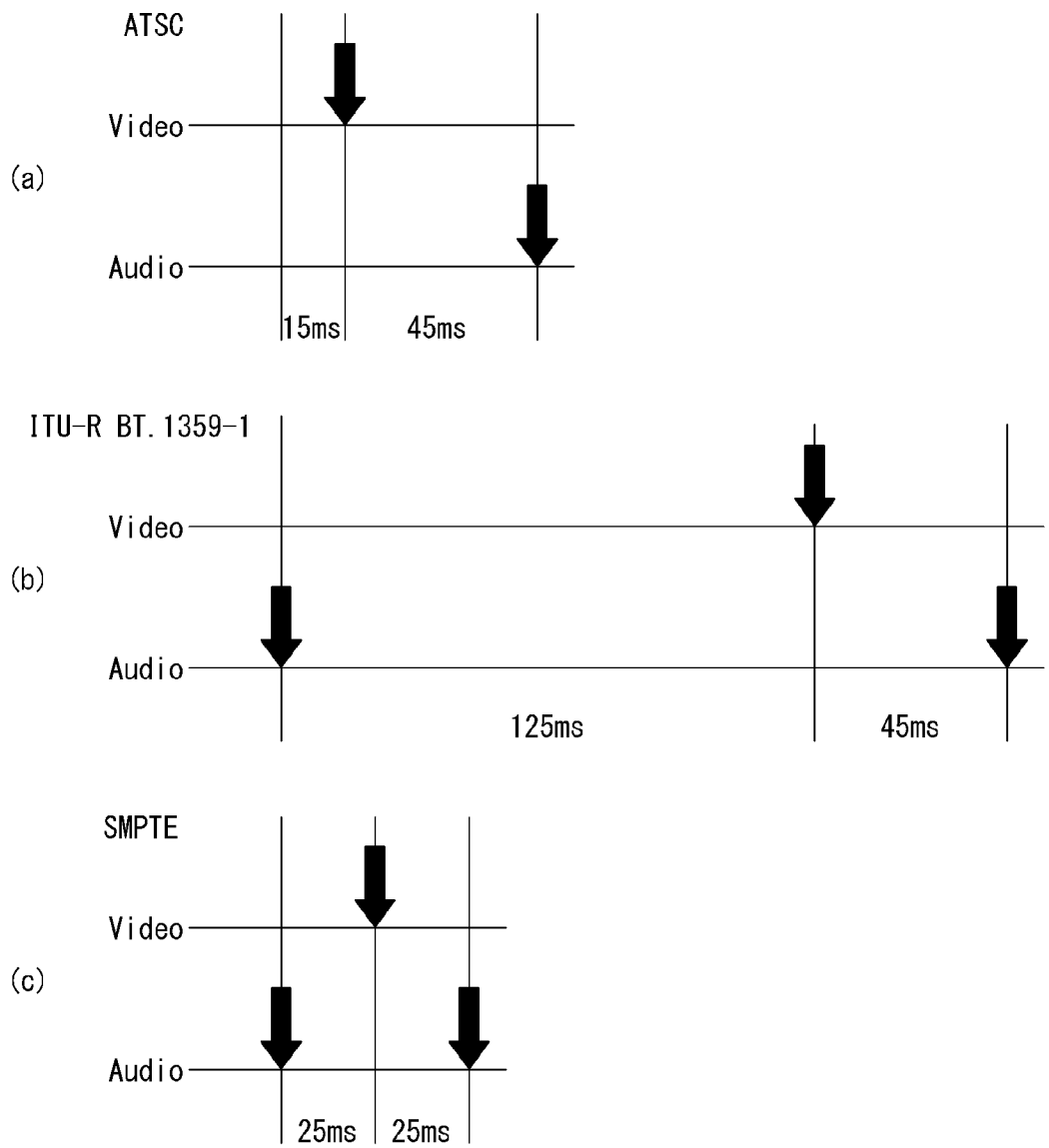

[FIG. 29]
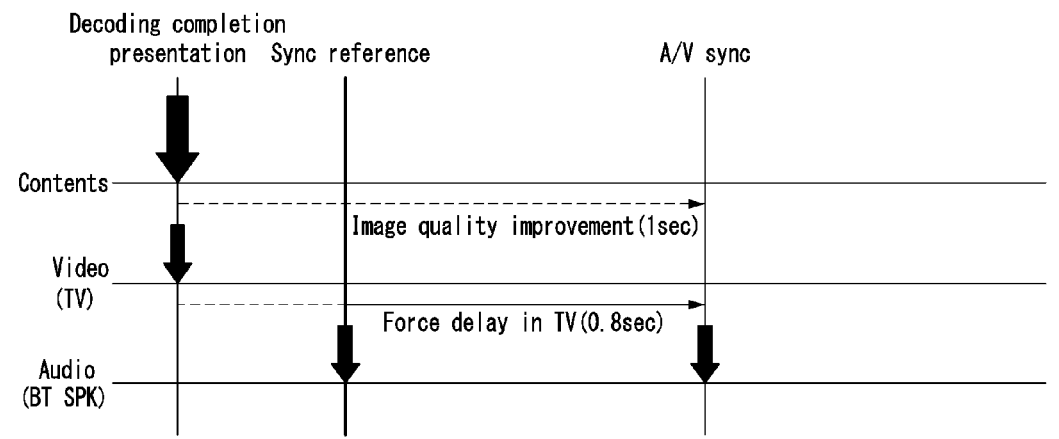
(a)
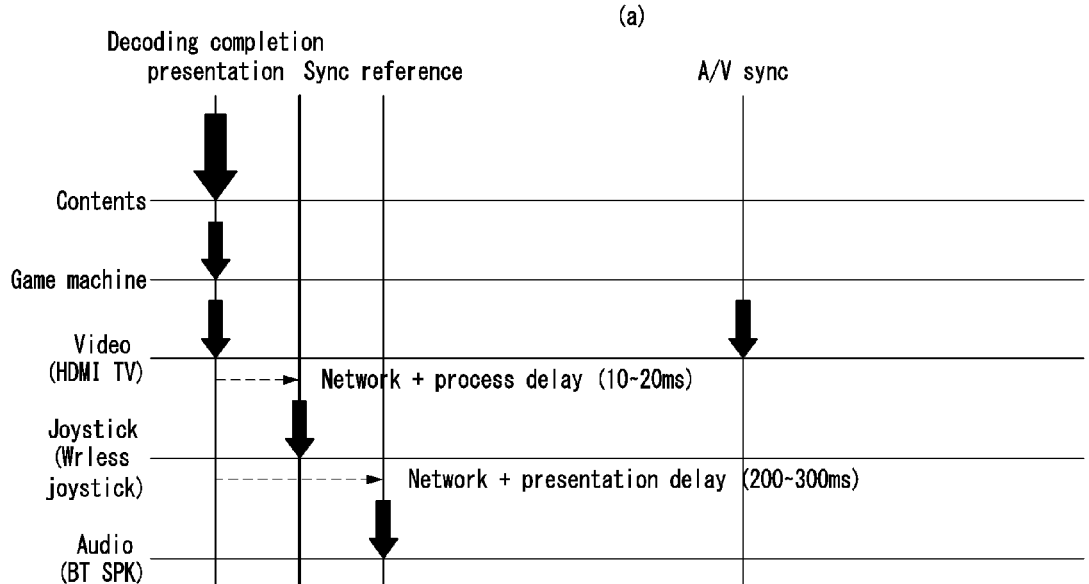
(b)

[FIG. 30]
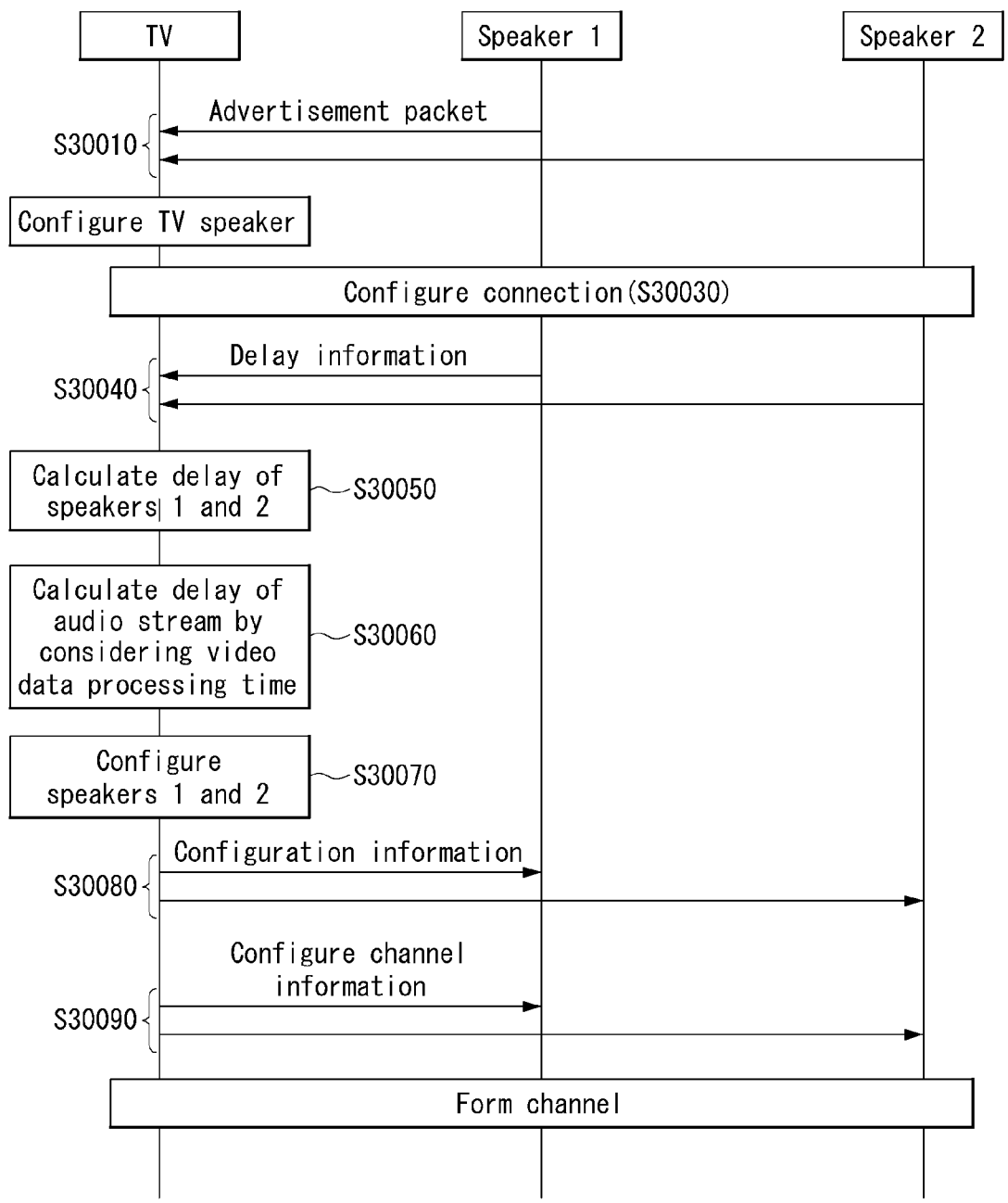

[FIG. 31]
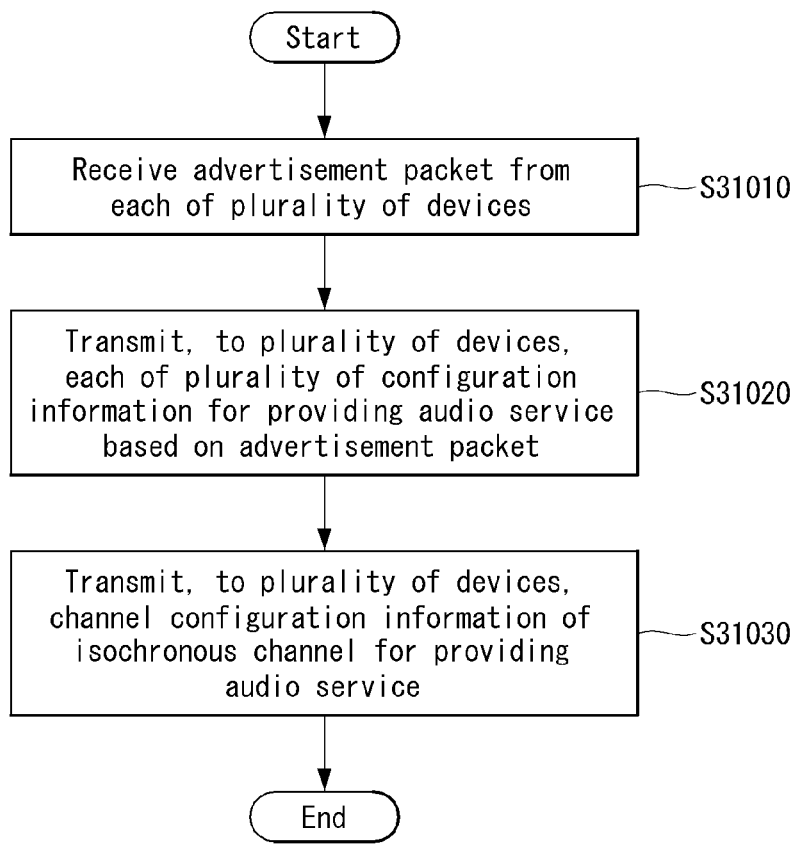

METHOD AND DEVICE FOR PROVIDING AUDIO SERVICE USING BLUETOOTH TECHNOLOGY

This application is the National Stage filing under 35 U.S.C. 371 of International Application No. PCT/KR2020/000889, filed on Jan. 17, 2020, which claims the benefit of KR Application No. 10-2019-0006397, filed on Jan. 17, 2019, the contents of which are all hereby incorporated by reference herein in their entirety.

TECHNICAL FIELD

The present disclosure relates to a method and a device for providing an audio service by using Bluetooth which is short-range technology in a wireless communication system, and more particularly, to a method and a device for providing an audio service through a plurality of speakers by using Bluetooth technology.

BACKGROUND ART

Bluetooth is a near field communication (NFC) technology standard allowing various devices to be wirelessly connected in a near field to exchange data. In a case in which two devices intend to perform wireless communication using Bluetooth communication, a user may perform a procedure for discovering a Bluetooth device with which he or she wants to communicate and requesting a connection. In the present disclosure, a device may refer to an apparatus or an appliance.

Here, the user may discover a Bluetooth device according to a Bluetooth communication method intended to be used using the Bluetooth device, and subsequently perestablish a connection.

Bluetooth communication methods include a basic rate/enhanced data rate (BR/EDR) method and a low energy (LE) method which is a low power method. The BR/EDR method may be referred to as Bluetooth Classic. The Bluetooth classic method includes a Bluetooth technology that has been continued from Bluetooth 1.0 using a basic rate and a Bluetooth technology using an enhanced data rate supported since Bluetooth 2.0.

The Bluetooth low energy (BLE) technology has been applied since Bluetooth 4.0 and may stably provide information of hundreds of kilobytes (KB) by consuming low energy. The BLE technology exchanges information between devices by utilizing an attribute protocol. This BLE method may reduce energy consumption by reducing overhead of a header and simplifying an operation.

Some Bluetooth devices do not have a display or a user interface. Complexity of connection/management/control/disconnection between various kinds of Bluetooth devices and Bluetooth devices employing similar technologies has increased.

Further, although Bluetooth may achieve a relatively high speed at a relatively low power and low cost, a transmission distance is generally limited to a maximum of 100 m, and thus, Bluetooth is suitable for use in a limited space.

DISCLOSURE

Technical Problem

The present disclosure provides a method and a device for transmitting audio data and voice data using Bluetooth technology.

Further, the present disclosure provides a method and a device for configuring a speaker in order to provide an audio service through an audio stream.

Further, the present disclosure provides a method and a device for providing the audio service by transmitting the audio stream through multiple speakers by using a wireless communication system.

Further, the present disclosure provides a method and a device for adjusting a sync between multiple speakers in providing the audio service through multiple speakers by using the wireless communication system.

Technical objects to be achieved by the present disclosure are not limited to the aforementioned technical objects, and other technical objects not described above may be evidently understood by a person having ordinary skill in the art to which the present disclosure pertains from the following description.

Technical Solution

The present disclosure provides a method and apparatus for a control device to set an audio channel using Bluetooth Low Energy technology in a wireless communication system for solving the above-described problems.

Specifically, the method for the control device according to an embodiment of the present disclosure to set an audio channel, comprising: receiving, from each of a plurality of devices, an advertisement packet, wherein the advertisement packet includes at least one of location information, codec information, and/or role information of each of the plurality of devices; transmitting, to the plurality of devices, each of a plurality of configuration information for providing an audio service based on the advertisement packet, wherein each of the plurality of configuration information includes delay information for each of the plurality of devices; and transmitting, to the plurality of devices, channel configuration information of an isochronous channel for providing the audio service.

In addition, in the present disclosure, wherein the delay information represents a delay for sync adjustment between the plurality of devices based on a delay until the plurality of devices output an audio stream.

In addition, in the present disclosure, wherein the advertisement packet further includes capability information representing a processing capability for the audio stream of the plurality of devices.

In addition, in the present disclosure, further comprising: calculating the delay information based on the advertisement packet.

In addition, in the present disclosure, wherein the delay information represents a delay for a sync adjustment between video data and an audio stream, in a case that a sync between the plurality of devices is adjusted and the video data is output, based on a delay until the plurality of devices output the audio stream.

In addition, in the present disclosure, further comprising: receiving, from each of the plurality of devices, presentation delay information representing a delay until an output of the audio stream.

In addition, in the present disclosure, further comprising: calculating the delay information based on the output delay information and a processing time of the video data.

In addition, in the present disclosure, comprising: a communication unit for communicating with outside wirelessly or by wire; and a processor functionally connected to the communication unit, wherein the processor configured to: receive, from each of a plurality of devices, an advertisement packet, wherein the advertisement packet includes at least one of location information, codec information, and/or role information of each of the plurality of devices; transmit, to the plurality of devices, each of a plurality of configuration information for providing an audio service based on the advertisement packet, wherein each of the plurality of configuration information includes delay information for each of the plurality of devices; and transmit, to the plurality of devices, channel configuration information of an isochronous channel for providing the audio service.

Advantageous Effects

According to a method for transmitting and receiving data by using Bluetooth technology according to an embodiment of the present disclosure, there is an effect that an audio service can be provided through transmission and reception of voice data and audio data.

Further, according to the present disclosure, there is an effect that a sync can be adjusted between multiple speakers in providing the audio service through multiple speakers by using a wireless communication system.

Further, according to the present disclosure, there is an effect that a 5.1-channel surround audio service can be provided by adjusting the sync between multiple speakers.

Further, according to the present disclosure, there is an effect that a 5.1-channel speaker can be flexibly constructed by adjusting the sync between multiple speakers.

It will be appreciated by persons skilled in the art that that the effects that could be achieved with the present disclosure are not limited to what has been particularly described hereinabove and other advantages of the present disclosure will be more clearly understood by a person skilled in the art to which the present disclosure pertains, from the following detailed description.

DESCRIPTION OF DRAWINGS

The accompany drawings, which are included to provide a further understanding of the present disclosure and are incorporated on and constitute a part of the present disclosure illustrate embodiments of the present disclosure and together with the description serve to explain the principles of the present disclosure.

FIG. 1 is a schematic diagram illustrating an example of a wireless communication system using the Bluetooth Low Power Energy technology proposed in the present disclosure.

FIG. 2 illustrates an example of an internal block diagram of a device which is available to implement the methods proposed in the present disclosure.

FIG. 3 is a diagram illustrating an example of a Bluetooth communication architecture to which the methods proposed in the present disclosure may be applied.

FIG. 4 illustrates an example of a structure of a generic attribute profile (GATT) of Bluetooth low energy.

FIG. 5 is a flowchart showing an example of a connection procedure method in Bluetooth low energy technology to which the present disclosure may be applied.

FIG. 6 illustrates characteristics of an audio signal.

FIG. 7 illustrates an example of a home ecosystem for applications where an isochronous channel may be used.

FIG. 8 illustrates an example of a Generic Audio Middleware (GAM) protocol stack to which the present disclosure may be applied.

FIG. 9 is a diagram illustrating an example of a Generic Audio Middleware (GAM) architecture to which the present disclosure may be applied.

FIG. 10 illustrates an example of an Isochronous Connection-Oriented (ICO) channel and a stream to which the present disclosure may be applied.

FIG. 11 illustrates an example of a Connectionless Isochronous (ICL) channel and a stream to which the present disclosure may be applied.

FIG. 12 is a schematic diagram illustrating an example of an audio streaming system to which the present disclosure may be applied.

FIG. 13 is a diagram illustrating an example of a device for providing an audio streaming service according to an embodiment of the present disclosure.

FIG. 14 is a diagram illustrating an example of a processing process of an audio stream according to an embodiment of the present disclosure.

FIG. 15 is a flowchart showing an example of a method for configuring multiple speakers according to an embodiment of the present disclosure.

FIG. 16 is a diagram illustrating another example of the processing process of the audio stream according to an embodiment of the present disclosure.

FIG. 17 is a diagram illustrating an example of a delay of an audio stream according to a plurality of speakers according to an embodiment of the present disclosure.

FIG. 18 is a flowchart showing an example of a method for configuring multiple speakers based on a delay according to each of multiple speakers according to an embodiment of the present disclosure.

FIG. 19 is a diagram illustrating yet another example of the processing process of the audio stream according to an embodiment of the present disclosure.

FIG. 20 is a diagram illustrating an example of a connection configuration according to an embodiment of the present disclosure.

FIGS. 21 to 24 are diagrams illustrating an example of a structure of a data packet according to an embodiment of the present disclosure.

FIG. 25 is a diagram illustrating an example of a method for detecting each speaker in order to configure multiple speakers according to an embodiment of the present disclosure.

FIGS. 26 and 27 are diagrams illustrating an example of a method for recognizing a location of a speaker according to an embodiment of the present disclosure.

FIGS. 28 and 29 are diagrams illustrating a method for adjusting a sync between image data and an audio stream according to an embodiment of the present disclosure.

FIG. 30 is a flowchart showing an example of a method for adjusting a sync between image data and an audio stream according to an embodiment of the present disclosure.

FIG. 31 is a flowchart showing an example of a method for configuring an audio channel according to an embodiment of the present disclosure.

MODE FOR DISCLOSURE

The aforementioned objects, features and advantages of the present disclosure will become more apparent through the following detailed description with respect to the accompanying drawings. Hereinafter, the embodiments of the present disclosure will be described with reference to the accompanying drawings, in which like numbers refer to like elements throughout the specification. In describing the present disclosure, a detailed description of known techniques associated with the present disclosure unnecessarily obscure the gist of the present disclosure, it is determined that the detailed description thereof will be omitted.

Hereinafter, a method and a device related to the present disclosure will be described in detail with reference to the accompanying drawings. In the following description, usage of suffixes such as 'module', 'part' or 'unit' used for referring to elements is given merely to facilitate explanation of the present disclosure, without having any significant meaning by itself.

FIG. 1 is a schematic diagram illustrating an example of a wireless communication system using Bluetooth low energy (BLE) technology to which the present disclosure may be applied.

A wireless communication system 100 includes at least one server device 120 and at least one client device 110.

The server device and the client device perform Bluetooth communication using a BLE technology.

First, BLE technology has a relatively small duty cycle, may be produced at low cost, and significantly reduces power consumption through a low data rate, and thus, it is possible to operate for more than a year in the case of using a coin cell battery, compared to Bluetooth basic rate/enhanced data rate (BR/EDR) technology.

In addition, the BLE technology simplifies a connection process between devices, and a packet size is smaller than that of the Bluetooth BR/EDR technology.

In BLE technology, (1) the number of RF channels is 40, (2) 1 Mbps is supported as a data rate, (3) topology is a scatternet structure, (4) latency is 3 ms, and (5) a maximum current is 15 mA or less, (6) output power is 10 mW (10 dBm) or less, and (7) the BLE technology is mainly used in applications such as mobile phones, watches, sports, healthcare, sensors, device control, and the like.

The server device 120 may operate as a client device in a relationship with other devices, and the client device may operate as a server device in a relationship with other devices. That is, in the BLE communication system, any one device may operate as a server device or a client device, and may operate as both a server device and a client device, if necessary.

The server device 120 may be represented as a data service device, a slave device, a slave, a server, a conductor, a host device, a gateway, a sensing device, a monitoring device and the like.

the client device 110 may be represented as a master device, a master, a client, a member, a sensor device, a sink device, a collector, a third device, a fourth device, and the like.

The server device and the client device correspond to main components of the wireless communication system, and the wireless communication system may include other components in addition to the server device and the client device.

The server device refers to a device which is provided with data from the client device, directly communicates with the client device, and provides data to the client device through a response when a data request is received from the client.

In addition, the server device sends a notification message and an indication message to the client device to provide data information to the client device. In addition, when the server device transmits the indication message to the client device, the server device receives a confirmation message corresponding to the indication message from the client.

In addition, in the process of transmitting and receiving the notification message, the indication message, and the confirmation message to and from the client device, the server device may provide data information to a user through a display unit or may receive a request input from a user through a user input interface.

In addition, the server device may read data from a memory unit or write new data to the corresponding memory in the process of transmitting and receiving a message to and from the client device.

In addition, one server device may be connected to a plurality of client devices and may be easily reconnected (or connected) with client devices by using bonding information.

The client device 120 refers to a device that requests data information and data transmission from the server device.

The client device receives data from the server device through the notification message, the indication message, and the like, and when the indication message is received from the server device, the client device sends a confirmation message in response to the indication message.

Similarly, the client device may provide information to the user through an output unit or receive an input from the user through the input unit in the process of transmitting and receiving a message to and from the server device.

In addition, the client device may read data from a memory or write new data into the corresponding memory in the process of transmitting and receiving a message to and from the server device.

Hardware components such as the output unit, the input unit, and the memory of the server device and the client device will be described in detail with reference to FIG. 2.

In addition, the wireless communication system may configure personal area networking (PAN) through Bluetooth technology. For example, in the wireless communication system, files, documents, and the like may be exchanged quickly and safely by establishing a private piconet between devices.

FIG. 2 illustrates an example of an internal block diagram of a device which is available to implement the methods proposed in the present disclosure.

As shown in FIG. 2, a server device includes a display unit 111, a user input interface 112, a power supply unit 113, a processor 114, a memory unit 115, a Bluetooth interface 116, other interfaces 117 and a communication unit (or transceiver) 118.

The display unit 111, the user input interface 112, the power supply unit 113, the processor 114, the memory unit 115, the Bluetooth interface 116, the other interface 117 and the communication unit 118 are functionally connected to perform the method proposed in the present disclosure.

In addition, a client device includes a display unit 121, a user input interface 122, a power supply unit 123, a processor 124, a memory unit 125, a Bluetooth interface 126 and a communication unit (or transceiver) 127.

The display unit 121, the user input interface 122, the power supply unit 123, the processor 124, the memory unit 125, the Bluetooth interface 126 and the communication unit 127 are functionally connected to perform the method proposed in the present disclosure.

The Bluetooth interface 116 or 126 is referred to as a unit (or module) which is available to transmit a request/response, a command, an alarm, an indication/acknowledge message or a data between devices by using the Bluetooth technology.

The memory 115 or 125 is a unit implemented in various types of devices and referred to as a unit in which various types of data are stored.

The processor 114 or 124 is referred to a module for controlling overall operations of the server device or the client device and controls to process a transmission request of a message through the Bluetooth interface or other communication interface and process a received message.

The processor 114 or 124 may be represented as a control part, a control unit, a controller, and the like.

The processor 114 or 124 may include an application-specific integrated circuit (ASIC), other chipset, a logical circuit and/or a data processing device.

The processor 114 or 124 controls the communication unit to receive an Advertising message from the server device, controls the communication unit to transmit a Scan Request message to the server device and receive a Scan Response message from the server device in response to the Scan Request, and controls the communication unit to transmit a Connection Request message to the server device for a Bluetooth connection configuration with the server device.

In addition, the processor 114 or 124 controls the communication unit to read or write data using an attribute protocol from the server device after a Bluetooth LE connection is established through the connection procedure.

The memory 115 or 125 may include read-only memory (ROM), random access memory (RAM), flash memory, a memory card, a storage medium and/or other storage device.

The communication unit 118 or 127 may include a baseband circuit for processing a wireless signal. When an embodiment is implemented in software, the technique may be implemented as a module (process, function, etc.) for performing the function described above. The module may be stored in the memory and executed by the processor.

The memory 115 or 125 may be interior or exterior of the processor 114 or 124 and may be connected to the processor 114 or 124 with a well-known means.

The display unit 111 or 121 is referred to a module for providing state information or message exchange information of a device to a user using a screen.

The power supply unit (power source supply unit) 113 or 123 is referred to a module for receiving an external power source or an internal power source under a control of a controller and supplying a power required for an operation of each of the elements.

As described above, the BLE technology has a small duty cycle and may reduce a power consumption significantly with a low-speed data transmission rate.

The user input interface 112 or 122 is referred to a module for a user to control an operation of a device by providing a user input like a screen button to the controller.

FIG. 3 is a diagram illustrating an example of a Bluetooth communication architecture to which the methods proposed in the present disclosure may be applied.

Particularly, FIG. 3 shows an example of the architecture of Bluetooth Low Energy (LE).

As shown in FIG. 3, the BLE architecture includes a Controller stack operable to process a wireless device interface of which timing is important and a Host stack operable to process a high level data.

The Controller stack may also be referred to as a Controller but referred to as the Controller stack below in order to avoid a confusion with the processor which is an internal element of the device mentioned with reference to FIG. 2 above.

First, the Controller stack may be implemented by using a communication module that may include a Bluetooth wireless device and a processor module that may include a processing device such as a microprocessor, for example.

The Host stack is a part of the OS operated on a processor module or may be implemented as an instantiation of a package on the OS.

In a part of instances, the Controller stack and the Host stack may be operated or executed on the same processing device in the processor module.

The Host stack includes GAP (Generic Access Profile) 310, GATT based Profiles 320, GATT (Generic Attribute Profile) 330, ATT (Attribute Protocol) 340, SM (Security Manage) 350 and L2CAP (Logical Link Control and Adaptation Protocol) 360. However, the Host stack is not limited thereto, but may include various protocols and profiles.

The host stack may multiplex various protocols, profiles, and the like provided in the higher Bluetooth layer by using the L2CAP.

First, the logic link control and adaptation protocol (L2CAP) 360 may provide one bidirectional channel for transmitting the data to a specific protocol or profile.

The L2CAP is operable to multiplex the data among higher layer protocols, segment and reassemble packages, and manage multicast data transmission.

In the BLE, three fixed channels (one for a signaling CH, one for the security manager, and one for the attribute protocol) are used.

On the contrary, in basic rate/enhanced data rate (BR/EDR), the dynamic channel is used and the protocol service multiplexer, the retransmission, the streaming mode, and the like are supported.

The security manager (SM) 350 is a protocol for authenticating the device and providing key distribution.

The attribute protocol (ATT) 340 defines a rule for accessing data of a counter device in a server-client structure. The ATT includes six following message types (request, response, command, notification, indication, and confirmation).

That is, ① Request and Response message: a request message refers to the message used by a client device to request specific information to a server device, and a response message refers to the message transmitted by the server device to the server device in response to the request message.

② Command message: a message transmitted from a client device to a server device to command a specific operation. The server device does not transmit a response to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

The generic access profile (GAP) 45 as a layer newly implemented for the BLE technology is used for selecting a role for communication among BLE devices and control how multi profiles are actuated.

Further, the GAP is primarily used in device discovery, connection creation, and security procedure parts and defines a scheme for providing the information to the user and defines the type of the attribute.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

GATT-based Profiles are profiles having a dependency on the GATT and is used mainly for BLE devices. GATT-based Profiles includes Battery, Time, FindMe, Proximity, Time, Object Delivery Service and the like; specific contents of the GATT-based profiles are as follows.

Battery: Battery information exchanging method
Time: Time information exchanging method
FindMe: Provision of alarm service according to distance
Proximity: Battery information exchanging method
Time: Time information exchanging method GATT is operable as a protocol for describing how the ATT is used at the time of setting the services. For example, the GATT is operable to regulate how ATT attributes are together grouped by the services and operable to describe features associated with the services.

Therefore, the GATT and the ATT may use the features in order to describe the status of the device and the services and describe how the features are associated with each other and how the features are used.

The Controller stack includes a Physical Layer 390, a Link Layer 380 and a Host Controller Interface 370.

The Physical Layer (wireless transceiver module) 390 is a layer of transmitting and receiving a wireless signal of 2.4 GHz and uses GFSK (Gaussian Frequency Shift Keying) modulation and a frequency hopping technique configured with 40 RF channels.

The Link Layer 380 transmits or receives a Bluetooth packet.

In addition, the Link Layer 380 provides functions of generating a connection between devices after performing Advertising and Scanning functions using three Advertising channels and exchanging a data packet of maximum 42 bytes through 37 channels.

The HCI (Host Controller Interface) provides an interface between the Host stack and the Controller stack so as to provide a command and a data from the Host stack to the Controller stack and provide an event and a data from the Controller stack to the Host stack.

Hereinafter, the procedures of the Bluetooth low energy (BLE) technology will be described in brief.

The BLE procedures may be divided into a device filtering procedure, an advertising procedure, s scanning procedure, a discovering procedure, a connecting procedure, and the like.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertising event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertizing procedure to perform undirected broadcast to devices within a region.

Here, undirected broadcast refers to broadcasting in all directions rather than in a specific direction.

On the other hand, directed broadcast refers to broadcasting in a specific direction. Undirected broadcast is performed without involving a connection procedure between an advertising device and a device in a listening state (in what follows, it is called a listening device).

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertising events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of data from advertising devices using an advertising physical channel.

The scanning device transmits a scan request to an advertising device through an advertising physical channel in order to request additional data from the advertising device. The advertising device transmits a scan response as a response with respect to the scan request, by including additional data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device perestablishing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

FIG. 4 is a diagram illustrating an example of a structure of a GATT of BLE.

A structure for exchanging profile data of BLE will be described with reference to FIG. 4.

Specifically, the GATT defines a method of exchanging data using services and characteristics between Bluetooth LE devices.

In general, a peripheral device (e.g., a sensor device) acts as a GATT server and has definitions of services and characteristics, and a central device acts as GATT client.

A GATT client send a data request to the GATT server to read or write data, and all transactions begin at the GATT client and a response is from the GATT server.

The GATT-based operation structure used in the Bluetooth LE is based on a profile, a service, and a characteristic and may have a vertical structure as shown in FIG. 4.

The profile includes one or more services, the one or more services may include one or more characteristics or other services.

The service serves to divide data into logical units and may include one or more characteristics or other services. Each service has a 16-bit or 128-bit identifier called a universal unique identifier (UUID).

The characteristic is the lowest level unit in the GATT-based operation structure. The characteristic includes only one data and has a 16-bit or 128-bit UUID similar to the service.

The characteristic is defined as a value of various pieces of information and requires one attribute to include each information. The characteristic may use various continuous attributes.

The attribute includes four components and has the following meaning.

handle: address of attribute
Type: Type of attribute
Value: Value of attribute
Permission: authority to access attribute FIG. 5 is a flowchart illustrating an example of a connection procedure method in the Bluetooth Low Power Energy technique to which the methods proposed in the present disclosure may be applied.

A server transmits an Advertising message to a client through three Advertising channels (step, S5010).

Before a connection, the server may be called an Advertiser and, after a connection, the server may be called a Master. An example of the server is a sensor (temperature sensor, etc.).

In addition, the client may be called a Scanner before a connection and may be called a Slave after a connection. An example of the client is a smart phone.

As described above, Bluetooth performs a communication by dividing into total 40 channels through 2.4 GHz band. Three channels among the 40 channels are used for an exchange of packets such as various Advertising Packets transmitted and received to establish a connection.

The remaining 37 channels are used for an exchange of data after a connection to a data channel.

The client may receive the Advertising message, and then, transmit a Scan Request message to the server to obtain an additional data (e.g., server device name, etc.).

In this case, the server transmits a Scan Response message including an additional data in response to the Scan Request message.

Here, the Scan Request message and the Scan Response message may be types of an Advertising packet, and the Advertising packet may include only a User Data of 31 byte or smaller.

Accordingly, in the case that there is a data of which size is greater than 3 bytes but of which overhead is great to send a data by establishing a connection, the data is sent in a dividing manner through two times using the Scan Request message/the Scan Response message.

Next, the client transmits a Connection Request message for a Bluetooth connection configuration with the server to the server (step, S5020).

Through this, a Link Layer (LL) connection is established between the server and the client.

Thereafter, the server and the client perform a security establishment procedure.

The security establishment procedure may be interpreted as a Secure Simple Pairing or may be performed with the Secure Simple Pairing.

That is, the security establishment procedure may be performed throughout Phase 1 step to Phase 3 step.

Particularly, a pairing procedure (Phase 1) is performed between the server and the client (step, S5030).

In the pairing procedure, the client transmits a Pairing Request message to the server, and the server transmits a Pairing Response message to the client.

Through the pairing procedure, authentication requirements, I(Input)/O(Output) capabilities, and Key Size are exchanged between devices. Through the information, a type of Key generation method to be used is determined in Phase 2.

Next, in Phase 2, a legacy pairing or a security connection is performed between the server and the client (step, S5040).

In Phase 2, a Temporary Key and a Short Term Key (STK) are generated, which are 128 bits to perform a legacy pairing.

Temporary Key: A key made to generate STK

Short Term Key (STK): A key value used to make an Encrypted connection between devices In the case that the security connection is performed in Phase 2, a Long Term Key (LTK) of 128 bits is generated.

Long Term Key (LTK): A key value used not only in an Encrypted connection between devices but also in a later connection Thereafter, in SSP Phase 3, a Key Distribution procedure is performed between the server and the client (step, S5050).

Through this, the security connection is established between the server and the client, and the Encrypted link is established, and accordingly, a data may be transmitted and received.

Overview of Isochronous Channel

FIG. 6 shows characteristics of an audio signal.

As shown in FIG. 6, in the case of an audio signal, audio streaming data or audio data is periodically generated at an idle event interval.

Audio data is generated periodically (or at a specific time interval) according to the characteristics thereof.

In this case, the specific time interval during which audio data is periodically generated may be represented as an idle event interval.

Audio data is transmitted at an individual idle event interval.

Furthermore, individual audio data may be transmitted throughout part of or the entire event interval.

As shown in FIG. 6, when audio streaming data generated periodically or regularly is transmitted according to the BLE mechanism, an advertisement and scanning procedure, a communication procedure, and a disconnection procedure have to be performed whenever the generated audio data is transmitted or received.

As shown in FIG. 6, however, since audio data is generated at a regular interval for most cases, latency needs to be guaranteed with respect to the transmission of the audio data regardless of the amount of the audio data.

If the advertisement and scanning procedure, the communication procedure, and the disconnection procedure are performed whenever newly generated audio data is transmitted, however, a latency problem occurs during the transmission of the audio data.

If the BLE technology rather than the Bluetooth BE/EDR technology is used, high energy efficiency can be achieved because a relatively small amount of audio data is transmitted through an HA or headset. As described above, however, great overhead is generated because the data channel process of the BLE technology involves advertising, connection, etc. whenever data is transmitted. Accordingly, latency absolutely required for the transmission of audio data cannot be guaranteed.

Furthermore, the data channel process of the BLE technology involves sending intermittently generated data only when necessary, thereby improving energy efficiency by leading a BLE device in a different time region to deep sleep. Therefore, it may be difficult to apply the data channel process of the BLE technology to the transmission of audio data generated at a regular interval.

For such a reason, it is necessary to define a new mechanism in which periodically generated data, such as audio streams, is transmitted and received using the BLE technology.

In addition, since the operation of the link layer for transmitting an audio signal is not defined, the BLE has difficulty in transmitting an audio signal. Even if the audio signal is transmitted, a procedure for a user device (e.g., a headset, a phone, etc.) transmit the audio signal to a target device by discovering a device capable of receiving and processing the audio signal needs to be defined.

Thus, the present disclosure provides a procedure in which the user device may determine devices capable of recognizing and processing the audio signal of the user and transferring the processed audio signal to the target device in order to control the devices with the voice of the user.

Hereinafter, methods for transmitting and receiving periodically generated data (e.g., audio data, voice data, etc.) using the BLE technology will be described in detail.

That is, in the BLE technology, provided is a method for newly defining a channel for transmitting and receiving the periodically generated data and transmitting periodically generated data within a range that does not impair energy performance of the BLE by additionally defining a mechanism related to the newly defined channel.

Terms including audio stream data, audio data, audio streaming, audio stream, and the like may be interpreted as the same meaning.

Hereinafter, for convenience of understanding, it will be assumed that the terms are unified and used as the audio data.

Isochronous Channel and Definition of a Mechanism Related to Isochronous Channel A new channel, that is, an isochronous channel, is defined to send data generated at a regular interval using the BLE technology.

An isochronous channel is used to send isochronous data to devices using isochronous streams.

Isochronous data refers to data transmitted at a particular time interval, that is, periodically or regularly.

In other words, an isochronous channel may represent a channel for sending and receiving periodically generated data, such as audio data, in the BLE technology.

An isochronous channel may be used to send and receive audio data to and from a single member, three of one or more coordinated members, or a plurality of members.

Furthermore, an isochronous channel corresponds to an isochronous stream, such as an audio stream, or a flushing channel which may be used to send and receive important data in other time regions.

Methods using an isochronous channel described later are used independently of the advertising channel and data channel defined in the existing (v4.2 or earlier) BLE technology.

Furthermore, this document additionally defines a new frequency channel and frequency hopping interval for an isochronous channel.

An isochronous channel enables a conductor to send an isochronous stream such as flushable data (e.g., time-bound audio data) to one or more members using the BLE.

In this case, the conductor may be represented as a master, and the member may be represented as a slave.

Furthermore, an isochronous channel may or may not be configured by security setting.

Furthermore, an isochronous channel may be set up for various topologies to allow the transmission of an isochronous stream between a single conductor and a member, between a single conductor and a coordinated pair of members which generates a stereo audio stream, such as hearing aids or stereo headsets, and between a single conductor and a plurality of members synchronized with the same isochronous stream(s).

In this case, the member may send data to the conductor through an isochronous channel.

Furthermore, the isochronous channel may support the transmission and reception of shared audio, public audio, and broadcast audio as well as the transmission and reception of personal audio.

A procedure for setting up an isochronous channel requires that hierarchy of profile level security and reliability requirements satisfy use cases.

Furthermore, an isochronous channel may be used for various applications, by which a plurality of audio sources and sinks may be set up, and complicated topologies may be set up to allow users to regularly change or share different audio streams.

FIG. 7 illustrates an example of a home ecosystem for applications where an isochronous channel may be used.

That is, FIG. 7 illustrates an example of a space in which multiple audio conductors and members to which the methods proposed by the present disclosure may be applied may move within or outside each other's area.

As illustrated in FIG. 7, the presence of various conductors and members may imply that the isochronous channel is needed as a method for informing the presence of a member so that the member may obtain information required for configuring the isochronous channel.

The isochronous channel may also be used for transmitting and receiving non audio data.

The member may use isochronous channels to determine whether there are notification messages that may include acquisition information from conductors within a BLE communication range.

Further, the member may use the isochronous channels to receive a request for control information or service data from one or one or more devices acting as a remote controller.

FIG. 8 illustrates an example of a Generic Audio Middleware (GAM) protocol stack to which the present disclosure may be applied.

An audio architecture including an Audio Middleware Layer may support unicast and broadcast audios using the BLE.

The audio middleware layer facilitates a transition between connections of audio application programs and may develop a more developed user case.

As illustrated in FIG. 8, by adding an audio middleware layer capable of accessing all audio profiles, the GAM may provide a smooth audio service to the user even in a dynamic and multi-profile environment. Since middleware may handle switching between audio mixing of various user cases and the user cases, each profile may concentrate on a specific function.

Since the GAM may support multiple profiles, the user may select an audio content range and an application program which may seamlessly move between voice operating devices.

The GAM defines announcements for the audio streaming and signal transmission for audio control and data transmission. An application layer defines application signaling and required transmission parameters.

FIG. 9 is a diagram illustrating an example of a Generic Audio Middleware (GAM) architecture to which the present disclosure may be applied.

FIG. 9 illustrates how the GAM is located within an overall Bluetooth architecture. Application Profiles on the GAM interact with specific functional entities within the middleware.

The functional entities are grouped as follows.

Audio stream notification and search: Defines a procedure of informing an availability of the audio stream or an availability of a device capable of consuming the audio stream. Further, an Audio Stream Announcement and Discovery function entity may be used searching the device.

Stream management: A procedure of configuring and forming an endpoint within the device provide coordination of multiple sinks and sources, management of policies, and switching between the streams. A stream configuring procedure provides information required by an initiator to instruct a core to schedule the isochronous channel. The stream control includes a procedure of providing the audio data among the configured endpoint, a state system for each channel in the stream, and a state system search procedure.

Audio control: Procedure of activating a device function when the audio stream is configured. Basic call control capable of allowing, denying, and requesting the stream may be included in the audio control.

Broadcast control: Configures a broadcast audio channel and activates volume control.

As another audio work group defines requirements, media control and VR control may be then added to a release. An additional general control function may be added in order to support another user case when necessary. The control elements may inherit characteristics of a control procedure defined previously. Each control element includes a state system that is replicated to each device adjusted by using a general procedure for posting the state to an acceptor.

In the GAM, 6 interfaces for interacting a higher layer and a lower layer are defined as shown in Table 2 below.

TABLE 2

| Interface | Description |
| --- | --- |
| 1 | Interface to application-specific profile for announcements and discovery. |
| 2 | Interface to Core to send and receive audio announcements |
| 3 | Interface to application-specific profile for stream management. |
| 4 | Interface to Core for isochronous channel configuration, establishment and stream control. |
| 5 | Interface to application-specific profile for audio control. |
| 6 | Interface to Core for audio control. |

Further, an additional interface for audio control and stream management entities in the GAM may be defined as shown in Table 3 below.

TABLE 3

| Interface | Description |
| --- | --- |
| 7 | Interface to allow Audio Control actions to invoke the relevant Stream Management functions and associated actions. |

Stream announcement and discovery, stream management and audio control interfaces ①, ②, and ③ may interact with a higher layer application program related profile by using primitives shown in Table 4 below.

TABLE 4

| Interface | Primitives |
| --- | --- |
| 1 | Announce Metadata (Initiator) |
|   | Discover Metadata (Acceptor) |
|   | Read Acceptor Status |
|   | Publish Acceptor Status |
|   | Metadata Received Event |
| 3 | ACE discovery and configuration |
|   | Rendering Endpoint |
|   | Presentation Delay |
|   | Acquisition Delay |

TABLE 4-continued

| Interface | Primitives |
|---|---|
| 5 | Outgoing Call |
|   | Incoming Call |
|   | Accept Call |
|   | Hold Call |
|   | Reject Call |
|   | Terminate Call |
|   | Mute/Unmute Microphone |
|   | Mute/Unmute Speaker |
|   | Volume Control |
|   | List of current Calls |
| 7 | Open Stream |
|   | Configure Stream |
|   | (flush timeout, retransmission, etc.) |
|   | Start Stream |

TABLE 4-continued

| Interface | Primitives |
|---|---|
|   | Suspend Stream |
|   | Close Stream |
|   | Release Stream |

The present disclosure provides a method for controlling a target device through a voice signal by using the GAM.

FIGS. 10 and 11 illustrate an example of Isochronous Connection-Oriented (ICO) and Connectionless Isochronous (ICL) channels and streams to which the present disclosure may be applied.

The isochronous channel, which is a channel for transmitting and receiving the audio data in the Bluetooth LE, is divided into ICO and ICL.

The ICO as a channel based on the connection of the Bluetooth LE may be configured after ACL connection is configured between two devices connected by the Bluetooth LE.

The application profile may require an isochronous stream with one or more time related channels. A profile manager (or some middleware) manages requests for multiple profiles, assigns a stream ID for each profile, and assigns a channel ID for the channel in the corresponding profile. The stream ID and the channel ID are transmitted when the master M configures the ICO channel as slave 1 S1 and slave 2 S2 as illustrated in FIG. 10.

In the case of the ICO, one stream may be divided into two channel IDs and sent to the S1 and S2. For example, when the S1 is a wireless earphone attached to a right ear of the user and the S2 is a wireless earphone attached to a left ear, the user may listen to the music transmitted by M in stereo as illustrated in FIG. 10.

The ICL as a channel that is not based on the Bluetooth LE connection may be used for broadcasting the isochronous data. The isochronous data of the ICL channel may be broadcasted using a frequency hopping technique.

The ICO and the ICL may transmit the audio signals to a plurality of devices and a plurality of profiles using the stream ID and the channel ID.

Table 5 below shows an example of a device type defined in audio technology of the Bluetooth LE and an operation scheme depending on the device type.

TABLE 5

| Device | Event | Initiation | Underlying Action | Typical | Max |
|---|---|---|---|---|---|
| Phone | Incoming Call | External | ICO established | 2 sec | 5 sec |
|  | Start Call | User initiated on phone | ICO established | 2 sec | 5 sec |
| TV | Turn On | User selects HA connection with controller. | ICO established | 5 sec | 10 sec |
|  | Turn On | ISO established with speakers? | ICO established | 5 sec | 10 sec |
|  | Add user | Needs Controller | Distribute GLK | 5 sec | 10 sec |
| Tablet | Video play | Local on tablet | ICO changes to ICL | 2 sec | 5 sec |
|  | Add user | User initiated | ICO >changes to ICL | 2 sec | 5 sec |
| Laptop | VoIP Call | External (incoming call) | ISO established | 2 sec | 5 sec |
|  |  | User initiated | ISO established | 2 sec | 5 sec |
| Remote Control | User press | Local (select device or volume, etc.) | ACL command to HA | 1 sec | 3 sec |
|  | Find Broadcasters | Background task? | Scan Audio-As | ? | 10 sec |
| Speaker | User presses ON | Local (connects to default source) | ICO established | 5 sec | 10 sec |
|  | User changes audio source | Action at speaker (if supported) or source | ICO established | 5 sec | 10 sec |
| Doorbell | Rings | External | ISO established | 2 sec | 5 sec |
| HA/ Headset | Start Call | User initiated (open voice recog. channel) | ISO established | 1 sec | 4 sec |
| Audio Gateway | Voice Command | External (User intitiating) | ISO established | 1 sec | 3 sec |

FIG. 12 is a schematic diagram illustrating an example of an audio streaming system to which the present disclosure may be applied.

Referring to FIG. 12 an audio streaming service may be provided through a plurality of speakers by using a wireless communication system. Hereinafter, the audio streaming service may be referred to as an audio service.

Specifically, services providing streaming contents such as image data and/or audio data by using a 5.1-channel surround system are increasing. As such, in order to construct a surround system through the image data and/or the audio data by using the 5.1-channel surround system, a 5.1-channel speaker should be connected to a reproduction device or a receiver by wire.

The legacy wire scheme surround system requires a relatively higher price than a 2.1-channel audio system and is a wire scheme, and as a result, there is a problem in that there is a constraint in spatial utilization.

Further, when wireless communication (e.g., Bluetooth, etc.) is used, there is no synchronization function because 1 to 1 connection is primarily applied, and an encoding delay of a used SBC codec is large, and as a result, there is a problem in that it is difficult to apply the legacy wire scheme surround system to a surround system such as a 5.1 channel requiring a synchronization between multiple speakers.

Accordingly, the present disclosure provides a method for streaming image data and/or audio data by using a plurality of speakers (e.g., 5.1 channels, etc.) by using wireless communication in order to solve such a problem.

When an audio stream (or audio data) is output by using the plurality of speakers as illustrated in FIGS. 12(a) to 12(c), the output audio stream may vary depending on the location of each speaker.

For example, when the audio stream is output through the 5.1 channel, an equalizer of the output audio stream may be adjusted differently according to the location of the speaker in order to transfer a stereoscopic sound to the user.

In this case, since multiple speakers uses not the wired communication but the wireless communication, multiple speakers may be flexibly arranged without being constrained by a device (e.g., a TV, an audio device, etc.) transmitting the audio stream.

FIGS. 12(a) to 12(c) illustrate a surround system in the case of reproducing the audio stream. In this case, when there are two wireless speakers using the wireless communication (e.g., Bluetooth, etc.) and there are three speakers in the TV as illustrated in FIG. 12(a), two wireless speakers may serve as rear left (RL) and rear right (RR) according to the location, and three speakers in the TV may serve as front left (RL), front right (FR), and center (C), respectively.

In this case, the RL may reproduce (or output) an audio stream of a left surround in the surround system and the RR may reproduce (or output) an audio stream of a right surround.

FIG. 17(b) illustrates a case where there area four wireless speakers using the wireless communication and there is one speaker in the TV, and FIG. 17(c) illustrates an example of a case where there is five wireless speakers using the wireless communication.

FIG. 13 is a diagram illustrating an example of a device for providing an audio streaming service according to an embodiment of the present disclosure.

Referring to FIG. 13, a device (hereinafter, referred to as TV or initiator) outputting streaming and/or outputting the audio data and/or video data may encode each data and transmit the encoded data to a device (hereinafter, referred to as speaker or acceptor) outputting the audio data.

Specifically, the TV may directly output the video data, and encode and transmit the audio stream according to a role of each of a plurality of speakers in order to output the audio data for outputting the video data through the surround system.

In this case, the TV may include a video display for outputting the video data, an audio decoder and/or encoder for encoding and/or decoding the audio data, a wireless communication interface (e.g., Bluetooth LE interface) for wirelessly transmitting the encoded audio data, and a controller for controlling the same.

In this case, the audio decoder and/or encoder decodes an audio stream of Dolby or digital theater systems (DTS) into a pulse code modulation (PCM) file, and encodes the decoded PCM file into LC3 again and transmits the LC3 to each speaker through a wireless communication interface.

In this case, a compression rate and a sampling rate for each system are as follows.

Dolby: 48 kHz sampling rate, 1 to 5.1 (6) channels, up to 448 kbit/s

DTS: 48 kHz or 96 kHz sampling rate, 2 to 6.1 channels, Half Rate (768 kbit/s) or Full Rate (1,536 kbit/s)

LC3: Mono codec, 96 kbps is equivalent to 256 kbps SBC, 200 kbps MP3

In this case, the TV may transmit configuration information for configuring each speaker, the configuration information may be transmitted bidirectionally, and stream data such as the audio data may be transmitted unidirectionally.

The speakers may be classified into roles such as FL, FR, C, RL, RR, and W based on the location and the audio stream output according to the location.

Further, the speaker may include a wireless communication interface (e.g., Bluetooth LE interface) for wirelessly receiving the audio stream and the configuration information, the audio decoder for decoding the audio data, an output unit for outputting the audio data, and a controller for controlling the same.

The audio decoder of the TV receives a Dolby 5.1-ch stream (or DTS 5.1-channel stream) and decodes PCM data with each of six channels. The each PCM stream may be encoded into LC3 which is a codec of a Bluetooth LE audio and transmitted to each of six speakers.

When there are two wireless speakers, each speaker may be used as Rear Left and Rear Right, respectively according to user's selection or setting, and the speakers in the TV may be used as Front Left and Front Right.

When there are three wireless speakers, each speaker may be used as Rear Left, Rear Right, and Woofer, respectively according to user's selection or setting, and the speakers in the TV may be used as Front Left and Front Right.

When there are five wireless speakers, each speaker may be used as Rear Left, Rear Right, Woofer, Front Left, and Front Right, respectively according to user's selection or setting, and the speakers in the TV may be turned off or used as Center.

When there are six wireless speakers, each speaker may be used as Rear Left, Rear Right, Woofer, Front Left, Front Right, and Center, respectively according to user's selection or setting, and the speakers in the TV may be turned off.

In the case of 2 channels or 2.1 channels other than the surround system, external wireless speakers may be used as Left, Right, and Woofer.

FIG. 14 is a diagram illustrating an example of a processing process of an audio stream according to an embodiment of the present disclosure.

Referring to FIG. 14, the TV may receive and decode the audio stream, and encode the decoded data in a specific format and transmit the encoded data to the speaker through each channel, in order to provide the content streaming service including the video and the audio to the user through the surround system.

Specifically, as illustrated in FIG. 14, the audio decoder of the TV receives a Dolby 5.1 channel stream (or DTS 5.1 channel stream) from a server providing contents, and decodes the PCM data with each of six channels.

Thereafter, each PCM stream may be encoded into a specific audio codec (e.g., LC3 which is the Bluetooth LE audio codec, etc.) and transmitted to each speaker through each channel by using the wireless communication interface.

In this case, the encoded audio stream may be transmitted through the isochronous channel. For example, the encoded audio stream may be transmitted to the speaker through the Connected Isochronous Stream (CIS) channel.

In this case, a group of CISs having the same timing reference may be referred to as Connected Isochronous Group (CIG).

Upon receiving the encoded audio stream through the CIS channel by using the wireless communication interface, each speaker may decode and output the audio stream through the decoder.

FIG. 15 is a flowchart showing an example of a method for configuring multiple speakers according to an embodiment of the present disclosure.

Referring to FIG. 15, the TV may provide an audio streaming service by configuring each of a plurality of speakers.

Specifically, the TV receives an advertisement packet from a plurality of speakers (speakers 1 and 2) (S15010). The advertisement packet may include only brief information (e.g., information indicating that the speaker is prepared) so as to be received and identified by all peripheral devices or include role information of each speaker and capability information of the decoder so as to be received and identified by a specific device (e.g., TV, etc.).

In this case, when the advertisement packet is transmitted so as to be received and identified by only the specific device, the advertisement packet may include an address of the specific device.

The role information may be related to whether the speaker performs the role of the FL, FR, RL, RR, or C according to the location of the speaker.

The advertisement packet may include at least one of location information, codec information, and/or role information of each of the plurality of devices.

Thereafter, the TV may configure the speakers in the TV based on the received advertisement packet.

For example, when there are only two speakers for the surround system by the received advertisement packet, and speakers 1 and 2 perform the roles of the FL and the FR, respectively, the TV may recognize that speakers 1 and 2 performs the roles of the FL and the FR based on the advertisement packet transmitted from speaker 1 and speaker 2.

Thereafter, since the TV recognizes that external speakers 1 and 2 perform the roles of the FR and the FL, the speakers in the TV are configured to perform the roles of the RR, the RL, and the C, and each of codec parameters may be configured.

Thereafter, the TV may form a connection with speakers 1 and 2 through a connection setting procedure. In this case, the connection may be formed through the wireless communication such as Bluetooth LE (S15030).

Specifically, the TV may transmit a connection request message for requesting speakers 1 and 2 for connection formation, and based on the transmitted connection request message, the connection may be formed between the TV, and the speakers 1 and 2.

The TV may recognize locations of speakers 1 and 2 through the advertisement packet or a Published Audio Capability (PAC) search procedure in a connection setting step.

The speaker performing the role of the acceptor may send information corresponding to surround locations (Rear, Right, Rear, and Left) contained in the packet so as to be known by the TV performing the role of the initiator. The TV determines the locations of the Left and the Right, and then makes the information be included in an Audio Location Field of a Published Audio Capability (PAC) format.

In this case, the information included in the PAC field may be shown in Table 6 below.

TABLE 6

| Field | Description |
|---|---|
| Direction | This field takes a single value, either Sink or Source. |
| Codec ID | This field takes a single value, which is the codec identifier defined in the Bluetooth Assigned Numbers. |
| Audio Location | List of Audio Locations. This list has a minimum of one entry. Each entry may be a combination of Audio Locations. |
| Channel Mode | List of Channel Modes. This list has a minimum of one entry. |
| Sampling Frequency | List of Sampling Frequencies. This list has a minimum of one entry. |
| Codec-specific parameters | Variable-size codec-specific parameters defined by a profile. May be empty. |
| Content protection type | This field takes a single value, which is the content protection type defined in Bluetooth Assigned Numbers. |
| Content protection type specific value | Variable-size content protection type specific value defined by a profile. May be empty. |

Thereafter, the TV may configure each speaker according to the roles and the capabilities of speakers 1 and 2 (S15040).

For example, the TV may recognize the locations and decoding capabilities of speakers 1 and 2 based on the PAC field transmitted according to the advertisement packet transmitted from speakers 1 and 2 and/or the connection setting procedure.

Thereafter, the TV may determine the role (e.g., RL, RR, FL, FR, or C) of each speaker according to the locations of speakers 1 and 2, and determine the compression rate or a delay for outputting the audio stream according to the decoding capabilities of speakers 1 and 2.

The TV may transmit the configured information configured in each speaker to each speaker (S15050). The configuration information may include a role of the speaker receiving the configuration information and delay information for reproducing the audio stream.

Thereafter, the TV may configure a channel for transmitting the encoded audio stream to speakers 1 and 2, and transmit, to speakers 1 and 2, channel configuration information including information related to the configured channel (S15060).

In this case, the configured channel may be the isochronous channel, and the channel configuration information may include information capable of the audio stream through the isochronous channel, such as identification information for identifying the channel of the audio stream transmitted to each speaker.

The isochronous channel may transmit the audio stream in a connection state or a non-connection state, and isochronous channels having the same timing reference may be grouped into the same group.

Thereafter, the TV may transmit the audio stream to speakers 1 and 2 through the formed channel, and speakers 1 and 2 may decode and output the received audio stream through the decoder.

FIG. 16 is a diagram illustrating another example of the processing process of the audio stream according to an embodiment of the present disclosure.

FIG. 16(*a*) illustrates a processing procedure of the audio stream in the TV when there are two external wireless speakers as described in FIG. 15, and FIG. 16(*b*) illustrates the processing procedure of the audio stream at a receiver.

When there are two wireless speakers as illustrated in FIG. 16(*a*), each speaker may be used as Rear Left and Rear Right according to user's selection or setting, and the speakers in the TV may be used as Front Left and Front Right.

In this case, in the TV, since Center does not a separate speaker, Center may be downmixed, and sent to FL and FR or omitted, and since most Woofers also have no separate speaker, Woofer may be downmixed, and sent to FL and FR or omitted.

As illustrated in FIG. 16(*b*), the speaker that performs the role of the RL receives the audio stream for the RL, and decodes and outputs the received audio stream through the decoder, and the speaker that performs the role of the RR receives the audio stream for the RR, and decodes and outputs through the decoder.

Similarly even when there are two or more external speakers, each audio stream may be transmitted according to the role of the external speaker, and a role not performed by the external speaker may be performed by the speaker in the TV or downmixed and sent to the FL and the FR or omitted.

FIG. 17 is a diagram illustrating an example of a delay of an audio stream according to a plurality of speakers according to an embodiment of the present disclosure.

The TV sends two CIS streams sent to two speakers separately in a time division scheme. Therefore, based on an interval at which two streams, one of two streams may have been transmitted earlier than the other stream and the other stream may have been transmitted later.

Since two streams should be simultaneously reproduced by each speaker, the earlier transmitted stream may be delayed and output by a time of the stream transmitted later.

The TV (isochronous channel master) transmits a value of CIS_Synchronization_Delay calculated according to the number of CISs and the number of CIS subevents during initial channel configuration. The CIG_Synchronization_Delay value in which packets of all streams have been transmitted may be calculated by the TV and all CISs may be shared.

FIG. 18 is a flowchart showing an example of a method for configuring multiple speakers based on a delay according to each of multiple speakers according to an embodiment of the present disclosure.

First, since steps S18010 to S18030 are the same as steps S15010 to S15030 of FIG. 15, a description thereof will be omitted.

Each of speakers 1 and 2 may transmit, to the TV, delay information on a delay which occurs from reception of the audio stream to an output through decoding (S18040).

The delay information may include a minimum value and/or a maximum value of the delay which occurs from the reception of the audio stream to the output through the decoding by each speaker.

Thereafter, the TV may calculate a delay for all speakers to simultaneously reproduce the audio stream based on the delay information (S18050). For example, the TV may calculate a largest value of the delay which occurs from the reception of the audio stream to the output through the decoding as the delay for all speakers to simultaneously reproduce the audio stream.

For example, during actual decoding and/or outputting in application layers of two speakers, speaker makers are different or a purchase time is different, and as a result, a decoding and/or output time may be different when the capability is enhanced.

Even though each of two speakers receives an input LC3 stream and is synchronized in a network layer, a time (presentation delay) from decoding the LC3 into the PCM to actual output in the application layer may vary depending on the capability of each speaker.

In preparation for this case, each speaker reports, to the TV, the presentation delay at an appropriate time before making the CIS with the TV, and the TV sets a value common to min and max presentation delays of two speakers in each CIS stream, sends the CSI, sets the value to the common presentation delay value and adjust a sync.

Thereafter, the TV may configure each speaker according to the roles and the capabilities of speakers 1 and 2 (S18060).

For example, the TV may recognize the locations and decoding capabilities of speakers 1 and 2 based on the PAC field transmitted according to the advertisement packet transmitted from speakers 1 and 2 and/or the connection setting procedure.

Thereafter, the TV may determine the role (e.g., RL, RR, FL, FR, or C) of each speaker according to the locations of speakers 1 and 2, and determine the compression rate or a delay for outputting the audio stream according to the decoding capabilities of speakers 1 and 2.

The TV may transmit the configured information configured in each speaker to each speaker (S18070). The configuration information may include a role of the speaker receiving the configuration information and delay information for reproducing the audio stream and the common presentation delay value calculated by the TV.

Thereafter, the TV may configure a channel for transmitting the encoded audio stream to speakers 1 and 2, and transmit, to speakers 1 and 2, channel configuration information including information related to the configured channel (S18080).

In this case, the configured channel may be the isochronous channel, and the channel configuration information may include information capable of the audio stream through the isochronous channel, such as identification information for identifying the channel of the audio stream transmitted to each speaker.

The isochronous channel may transmit the audio stream in a connection state or a non-connection state, and isochronous channels having the same timing reference may be grouped into the same group.

Thereafter, the TV may transmit the audio stream to speakers 1 and 2 through the formed channel, and speakers 1 and 2 may decode and output the received audio stream through the decoder.

FIG. 19 is a diagram illustrating yet another example of the processing process of the audio stream according to an embodiment of the present disclosure.

FIG. 19(*a*) illustrates the processing procedure of the audio stream in the TV when there are three external wireless speakers, and FIG. 19(*b*) illustrates the processing procedure of the audio stream at the receiver.

When there are two wireless speakers as illustrated in FIG. 19(*a*), each speaker may be used as Rear Left, Rear Right, and Woofer according to user's selection or setting, and the speakers in the TV may be used as Front Left, Front Right, and Center.

In this case, in the TV, since most Centers have no separate speaker, Center may be downmixed, and sent to FL and FR or omitted.

As illustrated in FIG. 19(b), the speaker that performs the role of the RL receives the audio stream for the RL, and decodes and outputs the received audio stream through the decoder, and the speaker that performs the role of the RR receives the audio stream for the RR, and decodes and outputs through the decoder.

Further, the speaker that performs the role of the Woofer receives the audio stream for the Woofer, and decodes the received audio stream through the decoder, and then outputs the decoded audio stream.

Similarly even when there are three or more external speakers, each audio stream may be transmitted according to the role of the external speaker, and a role not performed by the external speaker may be performed by the speaker in the TV or downmixed and sent to the FL and the FR or omitted.

FIG. 20 is a diagram illustrating an example of a connection configuration according to an embodiment of the present disclosure.

In FIG. 20(a), when Master (initiator) transmits CONNECT_IND to Slave, the Slave may perform a procedure for connection immediately after receiving the CONNECT_IND.

In FIG. 29(b), when the Master transmits, to the Slave, AUX_CONNECT_REQ and AUX_CONNECT_RSP, the Slave also performs a subsequent substantial connection procedure identified by sending RSP.

FIGS. 21 to 24 are diagrams illustrating an example of a structure of a data packet according to an embodiment of the present disclosure.

FIG. 21 illustrates an example of the advertisement packet and FIG. 22 illustrates an example of a structure of a data packet.

Each of parameters of the packets illustrated in FIGS. 21 and 22 may be set as below.

AA: Access Address

WinSize: transmitWindowSize=winSize*1.25 msec (625 usec*2)

WinOffset: transmitWindowOffset=winOffset*1.25 msec

Interval: Connection Interval=Interval*1.25 msec

Latency: Connection Slave Latency=Latency (transmitWindowDelay)

Timeout: Connection Supervision Timeout=Timeout*10 msec

ChM: Used/Unused data channels

Hop: hopIncrement for data channel selection algorithm #1, 5~16

SCA: Master Sleep Clock Latency

FIGS. 23 and 24 illustrate an example of a message format for configuring the isochronous channel.

The message format of FIG. 23 may be used as LL Control PDU, and used for messages such as LL_CIS_REQ, LL_CIS_RSP, LL_CIS_IND, and LL_CIS_TERMINATE_IND.

Further, the parameter of each format of FIG. 23 may be set to the following values.

PHY_Info: M_TO_S, S_TO_M(1M, 2M, Coded PHY): bidirectional voice (HFP)

CIS_Offset (usec): 500 us~connInterval

ISOAL_PDU_TYPE: framed, unframed

SDU_Size: 0x0~0xfff, SDU_Interval(usec): 0xff~0xfffff

NSE: Number of SubEvent

Sub_Interval (usec): 400 us~ISO_Inteval

BN: Burst Number, FT: Flush Timeout (ISO_Interval number)

ISO_Interval (1.25 ms): 4~3200

The message format of FIG. 24 may be used for PDU (CIS and BIS) of a physical channel, and the data format of FIG. 24(b) may be applied to the PDU of the CIS and the data format of FIG. 24(c) may be applied to the BIS PDU.

The BIS PDU may include BIS Data PDU, Control PDU (CHANNEL_MAP_IND, TERMINATE_IND), etc., and the CIS PDU may include CIS Data PDU, Null PDU, etc.

In this each parameter may be set as below.

LLID: 00 (END), 01 (START/CONT), 10 (MORE), 11 (RFU)

NESN: NextExpectedSeq #, SN: Seq #, CIE (Close Isochronous Event), NPI (Null PDU Indicator)

LLID: 00 (END), 01 (START/CONT), 10 (MORE), 11 (BIGControl)

CSSN: ControlSubeventSeq #, CSTF: ControlSubeventTxFlag

FIG. 25 is a diagram illustrating an example of a method for detecting each speaker in order to configure multiple speakers according to an embodiment of the present disclosure.

Referring to FIGS. 25(a) to 25(c), the TV may recognize the location of the speaker according to a direction between the speaker and the TV, and determine the role of each speaker by automatically designating the location of the speaker according to the recognized location.

FIGS. 26 and 27 are diagrams illustrating an example of a method for recognizing a location of a speaker according to an embodiment of the present disclosure.

FIG. 26(a) illustrates an example of a method for recognizing the location of the speaker by using a method of Angle of Arrival (AoA), and FIG. 26(b) illustrates an example of a method for recognizing the location of the speaker by using a method of Angle of Departure (AoD).

The TV may recognize the location based on a signal transmitted from the speaker by using the methods in FIGS. 26(a) and 26(b), and configure a role for providing the audio stream service by using the surround system to each speaker based on the recognized location.

FIGS. 27(a) and 27(b) illustrate an example of a method for recognizing, by the TV, the location of the speaker by using the AoA method described in FIGS. 26(a) and 26(b).

Specifically, as illustrated in FIG. 27(a), it is assumed that reference angles of two multi antennas for direction finding of the TV are perpendicular to a TV screen (AoA), and in the case of the AoD, the reference angles are parallel to the TV screen.

When two speakers are located in the rear as Surround, the AoA and the AoD may know an angle of deviation of a peripheral device based on the TV, and as a result, when the angle of deviation is around +45 degrees, the speaker is determined as Rear left and when the angle of deviation is around −45 degrees, the speaker is determined as Rear Right. In respect to precision of the angle of deviation, a deviation of approximately 10 degrees is considered.

In the case of FIG. 27(b), four wireless speakers are present externally, and it is assumed that the reference angles of two multi antennas for the direction finding of the TV are perpendicular to the TV screen (a blue line in the figure).

In the case of the AoD, the reference angels are parallel to the TV screen. When two speakers are located in the rear as Surround, the AoA and the AoD may know the angle of deviation of the peripheral device based on the TV, and as a result, when the angle of deviation is around +45 degrees, the speaker is determined as Rear left and when the angle of deviation is around −45 degrees, the speaker is determined as Rear Right. In a case where the speakers are added to both sides of the TV as Left and Right, when the angle of deviation is around +90 degrees, the speaker is determined as Left and when the angle of deviation is around −90 degrees, the speaker is determined as Right. In respect to the precision of the angle of deviation, a deviation of approximately 10 degrees is considered.

The TV recognizes the location of the speaker by using such a method and determines the role of each speaker to transmit the resulting audio stream.

FIGS. 28 and 29 are diagrams illustrating a method for adjusting a sync between image data and an audio stream according to an embodiment of the present disclosure.

Referring to FIG. 28, when the output of the video data and the audio stream related to the video data are output through the wireless speaker, the video data and the audio stream are not synchronized.

For example, as illustrated in FIGS. 28(a) to 28(c), a delay between video and audio may occur according to a format scheme of the video.

In this case, delays which may occur according to respective encoding and/or decoding schemes are as below.

SBC: 200 ms
APT-X: 100 ms
LC3: 40 ms

In the case of encoding, a PCM file may be encoded into an SBC file, an MP3 file may be encoded into the SBC file via the PCM file, or a Dolby file may be encoded into the SBC file via the PCM file.

In the case of decoding, the SBC file may be decoded into the PCM file or an LC 3 file may be decoded into the PCM file.

In this case, a delay time for reproducing a video file and the audio stream should be determined by considering a processing time of the video file and a transmission and processing time of the audio stream, and the TV may determine such a delay time and transmit the determined delay time to each speaker.

FIGS. 29(a) and 29(b) illustrate an example of a method for determining and transmitting a delay time between video and audio, which may be generated when each TV operates in a specific mode.

FIG. 29(a) illustrates an example of a delay in an image quality improvement mode.

In this case, in respect to a time when the wireless speaker outputs the audio stream, the audio stream is delayed and output as compared with the TV. In this case, when the wireless speakers calculates a delay time up to the output of the audio stream, and reports the calculated delay time to the TV, the TV may calculate a time when the video data and the audio stream are reproduced at the same time based on the delay time up to the output of the video data and the delay time when the audio stream is transmitted and output to the wireless speaker, and adjust an output time of the video data based on the calculated time. Further, the TV transmits the calculated time to the speaker to adjust the sync so that the audio stream is output at the same time as the video data.

Alternatively, the TV may delay the transmission time of the audio stream.

FIG. 29(b) illustrates an example of a delay in a game mode environment.

In a game mode, a joystick is a sync reference point, and as a result, the video may be output as fast as possible without image quality improvement. In this case, since the video data and the audio stream should be output as fast as possible, the delay time should be calculated so that the audio stream and the video data are simultaneously output by reducing the delay time as much as possible.

FIG. 30 is a flowchart showing an example of a method for adjusting a sync between image data and an audio stream according to an embodiment of the present disclosure.

First, since steps S30010 to S30050 of FIG. 30 are the same as steps S18010 and S18050 of FIG. 18, the description thereof will be omitted.

The TV that receives delay information related to the delay time up to the output of the audio stream from speakers 1 and 2 may recognize the locations and the decoding capabilities of speakers 1 and 2 based on the advertisement packet transmitted from speakers 1 and 2 and/or the PAC field transmitted according to the connection configuration procedure.

The TV may determine the role (e.g., RL, RR, FL, FR, or C) of each speaker according to the locations of speakers 1 and 2, and determine the compression rate or a delay for outputting the audio stream according to the decoding capabilities of speakers 1 and 2 (S30060).

The delay time is a time for outputting the audio stream at the same time as the video data in each of speakers 1 and 2 by considering the processing time for the output of the video data.

In this case, the delay may be calculated through the methods described in FIGS. 28 and 29.

Thereafter, the TV may configure each speaker according to the roles and the capabilities of speakers 1 and 2 (S30070).

The TV may transmit the configured information configured in each speaker to each speaker (S30080). The configuration information may include a role of the speaker receiving the configuration information and delay information for reproducing the audio stream and the delay time calculated by the TV.

Thereafter, the TV may configure a channel for transmitting the encoded audio stream to speakers 1 and 2, and transmit, to speakers 1 and 2, channel configuration information including information related to the configured channel (S30090).

In this case, the configured channel may be the isochronous channel, and the channel configuration information may include information capable of the audio stream through the isochronous channel, such as identification information for identifying the channel of the audio stream transmitted to each speaker.

The isochronous channel may transmit the audio stream in a connection state or a non-connection state, and isochronous channels having the same timing reference may be grouped into the same group.

Thereafter, the TV may transmit the audio stream to speakers 1 and 2 through the formed channel, and speakers 1 and 2 may decode and output the received audio stream through the decoder. Further, the TV may output video data of which sync is adjusted according to the video data output by speakers 1 and 2.

FIG. 31 is a flowchart showing an example of a method for configuring an audio channel according to an embodiment of the present disclosure.

First, a control device (e.g., TV) may receive an advertisement packet from each of a plurality of devices (S31010). In this case, the advertisement packet may include at least one of location information, codec information, and/or role information of each of the plurality of devices.

Thereafter, the control device may transmit, to the plurality of devices, each of a plurality of configuration information for providing an audio service based on the advertisement packet (S31020). In this case, each of the plurality of configuration information may include delay information for each of the plurality of devices.

Thereafter, the control device may transmit, to the plurality of devices, channel configuration information of an isochronous channel for providing the audio service (S31030).

The delay information may represent a delay for sync adjustment between the plurality of devices based on a delay until the plurality of devices output an audio stream.

The advertisement packet may further include capability information representing a processing capability for the audio stream of the plurality of devices, and the control device may calculate the delay information based on the advertisement packet.

The delay information may represent a delay for a sync adjustment between video data and an audio stream, in a case that a sync between the plurality of devices is adjusted and the video data is output, based on a delay until the plurality of devices output the audio stream.

The control device may receive, from each of the plurality of devices, presentation delay information representing a delay until an output of the audio stream, and calculate the delay information based on the output delay information and a processing time of the video data.

Further, although the drawings have been individually described for ease of description, the embodiments shown in the drawings may be merged with each other to implement new embodiments. As necessary by those ordinary skilled in the art, designing recording media readably by a computer recording programs to execute the above-described embodiments also belongs to the scope of the present disclosure.

The direction-based device searching method proposed in the present disclosure, rather than limited to the configurations and methods according to the above-described embodiments, but may be configured so that all or some of the embodiments may be selectively combined with each other to allow for various variations or modifications.

Meanwhile, the direction-based device searching method of the present disclosure may be implemented as codes that are readable by a recording medium readable by a process provided in a network device. The recording media readable by the processor include all types of recording devices for storing data that is readable by the processor. Examples of the recording media readable by the process include ROM, RAM, CD-ROM, a magnetic tape, a floppy disc, an optical data storage device, and the like, and may be further implemented in the form of carrier waves such as transmitted over the Internet. Further, the recording media readable by the processor may be distributed to computer systems connected with each other via a network, and processor readable codes may be stored and executed in a distributing manner.

In addition, the preferred embodiments of the present disclosure have been depicted and described so far, but the present disclosure is not limited to the specific embodiment described above. It is understood that various modifications are available by those skilled in the dart without departing from the technical feature of the present disclosure claimed in claims, and such modifications should not be individually understood from the technical spirit and prospect of the present disclosure.

Further, both the method invention and the device invention are described in the present disclosure, and both the invention may be applied complementarily with each other as occasion demands.

INDUSTRIAL APPLICABILITY

An example in which the transmitting and receiving data of the present disclosure has been described applied to the Bluetooth LE, but the method may be applied to various wireless communication systems in addition to the Bluetooth LE.

The invention claimed is:

1. A method for a control device to set an audio channel using Bluetooth Low Energy technology in a wireless communication system, the method comprising:
   receiving, from each of a plurality of devices, an advertisement packet,
   wherein each advertisement packet includes at least one of location information, codec information, and role information of a corresponding one of the plurality of devices;
   receiving, from each of a plurality of devices, published audio capability (PAC) information including a combination of locations of the plurality of devices through a connection establishment with the plurality of devices;
   determining decoding performance for each of the plurality of devices based on the advertisement packet and PAC information of each of the plurality of devices, respectively;
   transmitting, to each of the plurality of devices, configuration information for providing an audio service based on the advertisement packet of each of the plurality of devices, respectively,
   wherein the configuration information transmitted to each of the plurality of devices includes delay information for each device based on the decoding performance of that device; and
   transmitting, to each of the plurality of devices, channel configuration information of an isochronous channel for providing the audio service.

2. The method of claim 1, wherein the delay information represents a delay for sync adjustment between the plurality of devices based on a delay until the plurality of devices output an audio stream.

3. The method of claim 1, wherein the advertisement packet further includes capability information representing a processing capability for the audio stream of the plurality of devices.

4. The method of claim 1, further comprising:
   calculating the delay information based on the advertisement packet received from each of the plurality of devices.

5. The method of claim 1, wherein the delay information represents a delay for a sync adjustment between video data and an audio stream, in a case that a sync between the plurality of devices is adjusted and the video data is output, based on a delay until the plurality of devices output the audio stream.

6. The method of claim 5, further comprising:
   receiving, from each of the plurality of devices, presentation delay information representing a delay until an output of the audio stream.

7. The method of claim 6, further comprising:
   calculating the delay information based on the output delay information and a processing time of the video data.

8. A control device for setting an audio channel using Bluetooth Low Energy technology in a wireless communication system, the control device comprising:
   a communication unit for communicating with outside wirelessly or by wire; and
   a processor functionally connected to the communication unit, wherein the processor is configured to:
receive, from each of a plurality of devices, an advertisement packet,
wherein each advertisement packet includes at least one of location information, codec information, and role information of a corresponding one of the plurality of devices;
receive, from each of a plurality of devices, published audio capability (PAC) information including a combination of locations of the plurality of devices through a connection establishment with the plurality of devices;
determine decoding performance for each of the plurality of devices based on the advertisement packet and PAC information of each of the plurality of devices, respectively;
transmit, to each of the plurality of devices, configuration information for providing an audio service based on the advertisement packet of each of the plurality of devices, respectively,
wherein the configuration information transmitted to each of the plurality of devices includes delay information for each device based on the decoding performance of that device; and
transmit, to each of the plurality of devices, channel configuration information of an isochronous channel for providing the audio service.

9. The control device of claim 8, wherein the delay information represents a delay for sync adjustment between the plurality of devices based on a delay until the plurality of devices output an audio stream.

10. The control device of claim 8, wherein the advertisement packet further includes capability information representing a processing capability for the audio stream of the plurality of devices.

11. The control device of claim 8, wherein the processor further configured to: calculate the delay information based on the advertisement packet received from each of the plurality of devices.

12. The control device of claim 8, wherein the delay information represents a delay for a sync adjustment between video data and an audio stream, in a case that a sync between the plurality of devices is adjusted and the video data is output, based on a delay until the plurality of devices output the audio stream.

13. The control device of claim 12, wherein the advertisement packet further includes presentation delay information representing a delay until an output of the audio stream.

14. The control device of claim 13, wherein the processor further configured to:
calculate the delay information based on the output delay information and a processing time of the video data.

* * * * *